United States Patent [19]
Gierhart et al.

[11] Patent Number: 5,730,602
[45] Date of Patent: Mar. 24, 1998

[54] COMPUTERIZED METHOD AND APPARATUS FOR TEACHING HANDWRITING

[75] Inventors: Harry S. Gierhart, Palo Alto, Calif.; Richard L. Kopp, Jr., Mesa, Ariz.

[73] Assignee: Penmanship, Inc., Mountain View, Calif.

[21] Appl. No.: 430,430

[22] Filed: Apr. 28, 1995

[51] Int. Cl.⁶ .................................................. G09B 19/00
[52] U.S. Cl. .......................... 434/155; 434/162; 434/169; 434/362; 345/179; 382/120
[58] Field of Search .......................... 434/118, 162–166, 434/307 R, 323, 362, 155, 156, 169, 308, 322, 327, 335, 365; 395/152–154, 761, 806, 807, 803; 345/173–179; 178/18, 19; 382/312–316, 119, 120

[56] References Cited

U.S. PATENT DOCUMENTS

| | | | |
|---|---|---|---|
| 3,690,020 | 9/1972 | McBratnie | 434/163 |
| 4,060,915 | 12/1977 | Conway | 434/307 R |
| 4,081,603 | 3/1978 | Davis et al. . | |
| 4,464,118 | 8/1984 | Scott et al. | 434/162 X |
| 4,526,547 | 7/1985 | Rusk . | |
| 4,633,436 | 12/1986 | Flurry | 434/162 X |
| 4,672,154 | 6/1987 | Rodgers et al. | 178/18 |
| 4,697,244 | 9/1987 | Murakami et al. . | |
| 4,740,161 | 4/1988 | Schwartz et al. | 434/162 |
| 4,786,764 | 11/1988 | Padula et al. . | |
| 4,793,810 | 12/1988 | Beasley, Jr. | 434/165 |
| 4,845,478 | 7/1989 | Taguchi et al. . | |
| 4,890,096 | 12/1989 | Taguchi et al. . | |
| 4,977,315 | 12/1990 | Purcell . | |
| 4,992,630 | 2/1991 | Mletzko . | |
| 5,004,871 | 4/1991 | Purcell . | |
| 5,018,208 | 5/1991 | Gladstone . | |
| 5,059,749 | 10/1991 | Murakami et al. . | |
| 5,077,802 | 12/1991 | Plamondon . | |
| 5,101,437 | 3/1992 | Plamondon . | |
| 5,174,759 | 12/1992 | Preston et al. | 434/307 R X |
| 5,287,415 | 2/1994 | Chefalas et al. . | |
| 5,302,132 | 4/1994 | Corder | 434/156 |
| 5,347,589 | 9/1994 | Meeks et al. . | |
| 5,357,062 | 10/1994 | Rockwell et al. . | |
| 5,501,601 | 3/1996 | Todokoro et al. | 434/163 X |
| 5,511,983 | 4/1996 | Kashii et al. | 434/365 |

Primary Examiner—Joe Cheng
Attorney, Agent, or Firm—Cahill, Sutton & Thomas P.L.C.

[57] ABSTRACT

A computerized system for teaching handwriting skills to a student displays a character to be written, prompting the student to use a digitizing pen to write the character on a digitizing surface, operating the digitizer to capture pen tilt angle, x,y coordinate values, pen tip pressure, pen tip height, and timing for each pixel. These pen stroke parameters and parameters computed therefrom, including pen tilt direction, are compared with stored corresponding "ideal" or "normal" data and the results of such comparisons are analyzed to determine whether a handwriting "process problem" exists. If so, appropriate "on the spot" corrective feedback information is generated and delivered in audible and/or visual form to the student at the times it will be most beneficial.

25 Claims, 8 Drawing Sheets

Microfiche Appendix Included
(4 Microfiche, 231 Pages)

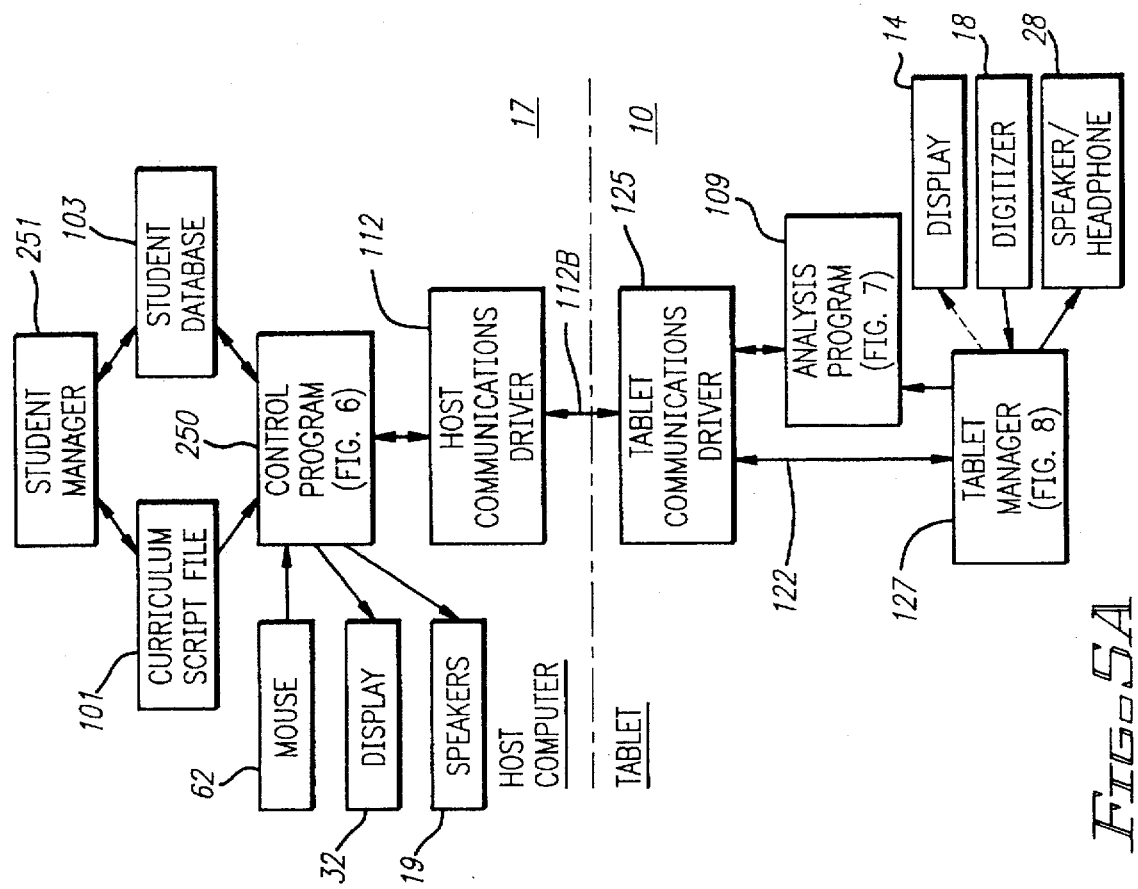
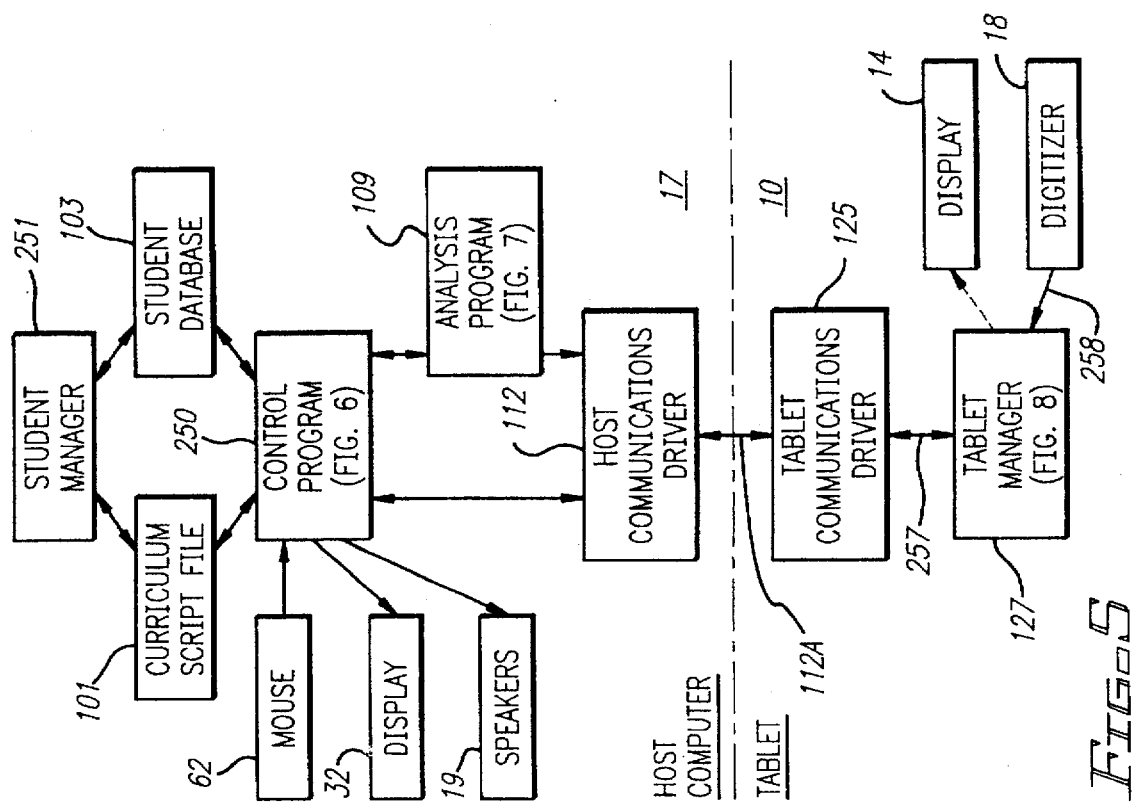

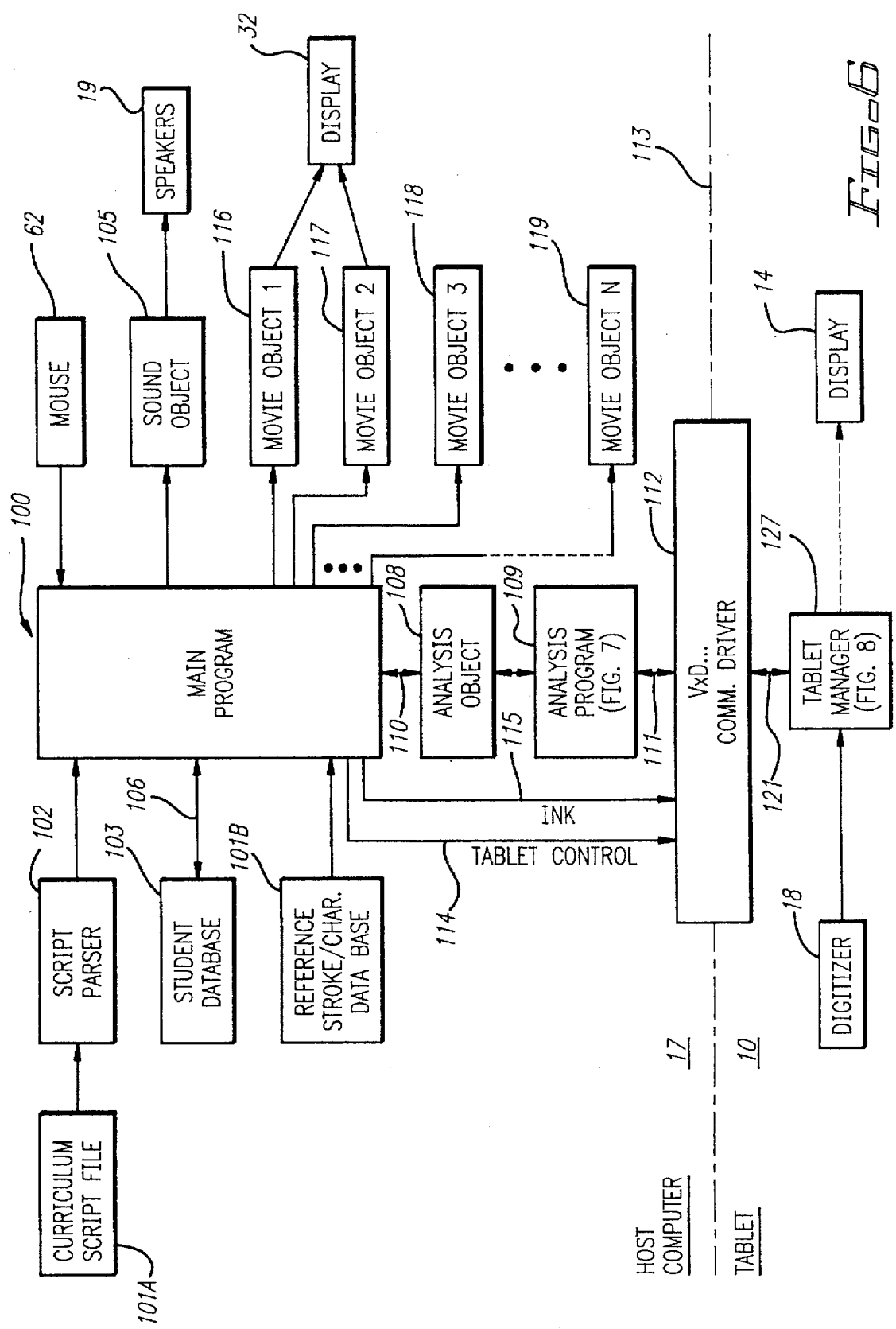

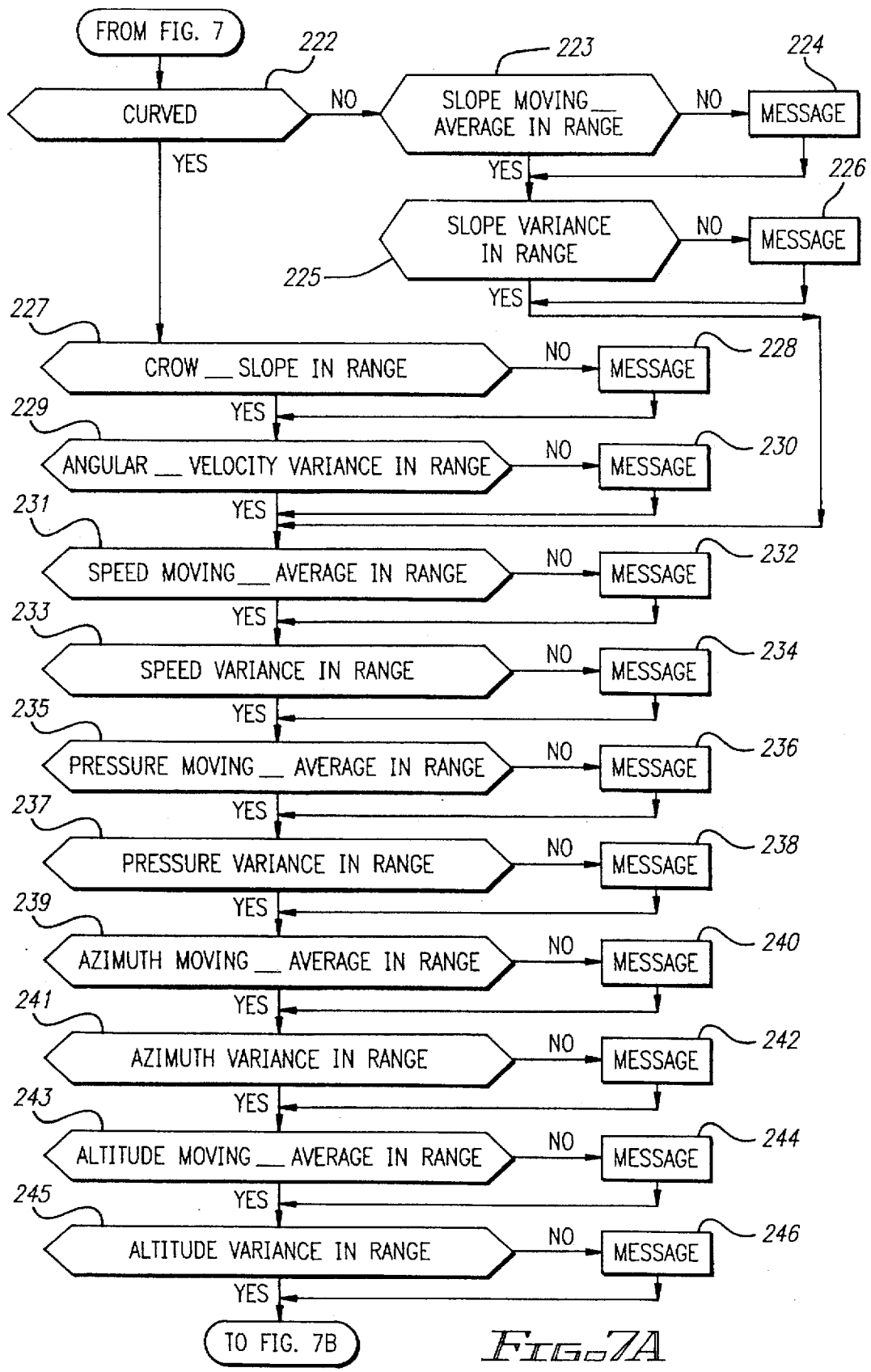

COMPUTERIZED METHOD AND APPARATUS FOR TEACHING HANDWRITING

REFERENCE TO MICROFICHE APPENDIX

A microfiche appendix (Appendix 2) containing a total of 4 sheets and 231 frames of microfiche is included in this application.

BACKGROUND OF THE INVENTION

The invention relates to a system and method for using a digitizer/screen tablet and a digitizing pen, wherein the system prompts a student to "write" a character stroke on a digitizing surface of a digitizer/screen tablet with the pen. The location of the pen tip, the pen tilt, the height of the pen tip from the digitizing surface, the pen tip pressure, the "pen tilt direction" or azimuth, and the finger grip pressure as the pen and the time are digitized or "captured" for each pixel. The captured information pertaining to the pen stroke is compared to stored "ideal stroke" information. The differences are utilized to generate corrective audio and/or video feedback information and deliver it to the student at the most beneficial time.

Various techniques have been developed for teaching handwriting skills to students; many are described in various well known texts. For example, the text "Basic Skills for Effective Communication", edited by Walter B. Barbe, Virginia H. Lucas and Thomas M. Waslylyk, copyright 1984, is a modern work containing many handwriting skill-building exercises. However, the techniques and exercises described therein usually are presented by one teacher to a relatively large number of students in a classroom. Under classroom conditions teachers ordinarily do not have time to accurately observe the many minute details of the handwriting techniques or "processes" employed by the various students or the "process problems" which certain students may encounter.

Such "process problems" are not necessarily clearly manifested in the handwriting strokes or characters actually produced by the students. For example, it may not be apparent that certain students are pressing the pen too forcefully against the writing surface and/or that they may be frequently improperly changing the tilt angle and/or azimuth of the pen during writing. Excessive acceleration/deceleration and/or inappropriate pauses and/or inappropriate lifting of the pen tip may be problematic for some students. Inappropriate finger gripping forces on the pen may be a process problem that interferes with effective learning for some students.

In the past it has been impossible for teachers or parents to detect many such "process problems" encountered by students learning handwriting skills and to provide "on the spot" corrective information and assistance at the moment or time when such corrective information would be most beneficial.

Building and enhancing student handwriting skills includes mind-eye-body training to Control movement of a pen. Skill-building handwriting techniques are necessarily progressive in nature, beginning with development of "gross motor control" and gradually proceeding to "fine motor control" of the student's wrist and fingers. The student is incrementally trained to write faster to produce handwriting that is easier to read. For example, training begins with developing skills in making the basic strokes for "unslanted" lower case and upper case characters. Training then proceeds to develop skill in making the strokes for slanted lower and upper case characters, and finally to forming connected cursive upper and lower characters.

Although pen tilt and pen pressure have been measured in prior digitizing tablets, the resulting information has been utilized only to correct pen tip location errors caused by pen tilt or to produce commands or editing information represented by amount of pen tilt or the amount of pen pressure.

There is an unmet need for an improved method and apparatus for teaching motor skills in general, and handwriting skills in particular, to students by automatic detection of "process problems" encountered by the students and providing fast "on the spot" corrective feedback to the students at a time at which it will be most beneficial. There also is an unmet need for an improved method and apparatus for teaching specific physical skills involving hand-eye coordination to students by automatic detection of "process problems" encountered during skill training and providing fast "on the spot" corrective feedback to such students at the times when such feedback will most beneficial. There also is an unmet need for an improved method and apparatus for effectively demonstrating such "process problems" to others, for example to the parents of the students.

SUMMARY OF THE INVENTION

Accordingly, it is an object of the invention to provide a system and apparatus that automatically detects "process problems" encountered by students learning handwriting skills by comparing pen x,y coordinates, pen tilt angle, pen tip height, pen tip pressure, and pen tilt direction or azimuth with stored "ideal" pen stroke information and generating "on the spot" corrective information to the student at the time it will be most beneficial.

It is another object of the invention to provide an apparatus and method of the foregoing kind at sufficiently low cost to encourage widespread use, especially in schools.

It is another object of the invention to provide a technique for efficiently using measurements of pen tilt angle to analyze handwriting technique.

It is another object of the invention to effectively use measurements of the pen tip pressure to analyze handwriting technique.

It is another object of the invention to use measurements of pen height above the writing surface to analyze handwriting technique.

It is another object of the invention to use measurements of finger grip pressure on the pen to analyze handwriting techniques.

It is another object of the invention to use measurements of pen tilt angle or azimuth to analyze handwriting techniques.

It is another object of the invention to use real time measurements of pen parameters and comparison thereof with "ideal" or "normal" pen stroke information to provide instant or timely feedback information to the student.

It is another object of the invention to utilize measurements of the timing and/or pauses associated with various portions of a pen stroke and comparison thereof with stored "ideal" or "normal" timing and/or pause information to produce corrective feedback information to the student at times when it will be most beneficial.

It is another object of the invention to provide an improved apparatus and method for effectively demonstrating "process problems" associated with learning of handwriting skills to the student and/or to the student's parents.

It is another object of the invention to utilize measurements of the timing and/or pauses associated with various portions of a pen stroke and comparison thereof with previously captured or entered timing and/or pause information to produce corrective feedback or instructional information to the student at times when it will be most beneficial.

It is another object of the invention to provide a system and apparatus that automatically detects "process problems" encountered by students learning skills involving hand-eye coordination by measuring movements produced in response to movements of the student's hand and comparing such movements with corresponding stored "ideal" movements and generating on the spot corrective information to the student at times at which such information will be beneficial.

It is another object of the invention to provide a method and apparatus for demonstrating such process problems so they can be effectively understood by the student and/or other interested persons.

Briefly described, and in accordance with one embodiment thereof, the invention provides a system and method for teaching handwriting skills to a student using a computer to display a character or word on a screen, prompting the student to use a digitizing pen to write the character or word on a digitizing surface of a digitizer, operating the digitizer to measure location and orientation parameters, such as pen tilt angle, pen tilt direction, x,y pen tip coordinate values, pen tip pressure, finger grip force, pen tip height above the digitizing surface, and "captured time" of measurement for each pixel of the digitizing surface affected by the location and/or orientation of the pen. The measured location and orientation parameters and captured times are compared with stored corresponding "ideal" parameters and times. The results of such comparisons are analyzed to determine whether a handwriting execution or "process" problem exists. If it does, appropriate corrective feedback information is generated and delivered in audible and/or visual form to the student at the most beneficial times. The computer determines whether a deviation of a character written on the digitizing surface is a large, medium, or small deviation, and determines on that basis whether the corrective information is to be presented to the student immediately, at the end of a present stroke, or at the end of a present line. In the described embodiment, the screen or display lies flat on a digitizing surface of a digitizer tablet including a microcomputer. The digitizer tablet and the tablet screen are part of a "student station" or tablet unit, wherein information is transferred, either wirelessly or by cable, between the microcomputer and a host computer. In one embodiment a number of student stations communicate with one teacher station.

In the described embodiment the host computer is operated in accordance with stored curriculum information, wherein the curriculum information includes a plurality of handwriting lessons each including a plurality of video objects and a plurality of corresponding sound objects and scripting information. The video objects each represent a plurality of images which produce video images when displayed in rapid sequence. The sound objects each represent a plurality of sounds to be produced in synchronization with the video images. The scripting information represents coded information executable by the computer to display the images and produce the sounds in synchronization so as to communicate lesson information to the student. The video objects each include image frames including full-screen image frames and partial-screen image frames, wherein the partial-screen image frames contain mainly changed image areas and exclude image areas which are unchanged relative to preceding image frames. The video objects are composed of as many partial-screen image frames as practical to represent movement of images of the video objects and making each partial-screen image frame as small as practical so as to exclude as many unchanged pixels as practical from information to be transmitted from the computer to the tablet unit. In the described embodiment, the tablet unit is linked to the host computer by a parallel port in the tablet unit and a parallel port in the host computer, although various other external host ports could be used, including serial, SCSI, or PCM/CIA ports or the new Microsoft Plug and Play port, or other "non-video" ports. All image frames are transmitted or down-loaded in a compressed data format from the host computer to the tablet unit via the parallel ports, whereby video objects containing animated subject matter with sufficient image movement to teach the handwriting skills can be downloaded from the host computer to the tablet unit and displayed on the display unit thereof.

In the described embodiment, characters and sequence information included in the curriculum information for a selected handwriting lesson are loaded into a memory of the host computer. The host computer is operated to (1) select a next available character as a "present character" to be written by the student, (2) select a next available stroke of the present character as a "present stroke" to be written by the student, (3) obtain such pen data by either (i) obtaining such pen data from a previous pixel if that is necessary to determine if the present stroke is being written with a correct curvature, or otherwise (ii) obtaining such pen data from the next available pen data from the digitizer, (4) store the pen data obtained for a present pixel, (5) perform a check on the pen data for the present pixel to determine if a tip of the pen is up from the digitizing surface or down on the digitizing surface, and if the tip is up, determine if it has been up for a predetermined pause time, and if it has not, generate a pen tip up corrective message, and if the tip is down, determine if the present pixel is a first pen down point, and if it is, determine if the pen is within a first pen down point target area, and if it is not, generate a first pen down point corrective message, (6) if the present stroke is to be curved, compare a slope parameter thereof to a slope parameter reference value, and produce a first slope corrective message if the slope parameter is outside of a corresponding target range, and compare an angular velocity parameter thereof to an angular velocity reference parameter, and produce an angular velocity corrective message if the angular velocity parameter is outside of a corresponding target range corresponding thereto, (7) if the present stroke being drawn is to be straight, compare a slope parameter thereof to a slope parameter reference value, and produce a second slope corrective message if the slope parameter is outside of a corresponding target range corresponding thereto, (8) perform a plurality of comparisons of values of a pen tip speed parameter, a pressure parameter, a pen tilt direction parameter, a pen tip height parameter, and a finger force parameter to corresponding reference parameter values, respectively, and produce corresponding corrective messages if such values are not within corresponding target ranges, respectively, (9) perform a plurality of tests on the pen data of the present pixel and, if any of the tests is met, store pen data received from the digitizer for all pixels of the digitizing surface affected by the tip of the pen since a most recent check point, (10) use the pen data stored in step (9) to determine if the present pixel is at the end of the present stroke, and if it is, determine if the present pixel is within a predetermined range from a stop point for the present stroke and if it is not, generate a corresponding stop point corrective message, and (11) determine if the present pixel is at the end of the present character, and obtain a next available stroke of the present character if the present pixel is not at the end of the present character, and obtain a next available character if the present pixel is at the end of the present character.

BRIEF DESCRIPTION OF THE DRAWINGS

FIG. 5 is a flow chart useful in generally describing the processes performed in host processor 17 and student station 10 of FIG. 1.

FIG. 5A is a block diagram useful in describing the processes performed in host processor student station 10 of an embodiment of the invention in which multiple student tablets may be connected via wireless links to the host computer.

FIG. 6 is a more detailed version of the flow chart of FIG. 5.

FIG. 7A is a detailed flow chart of block 215 of FIG. 7.

DETAILED DESCRIPTION OF THE PREFERRED EMBODIMENTS

Figure 1:
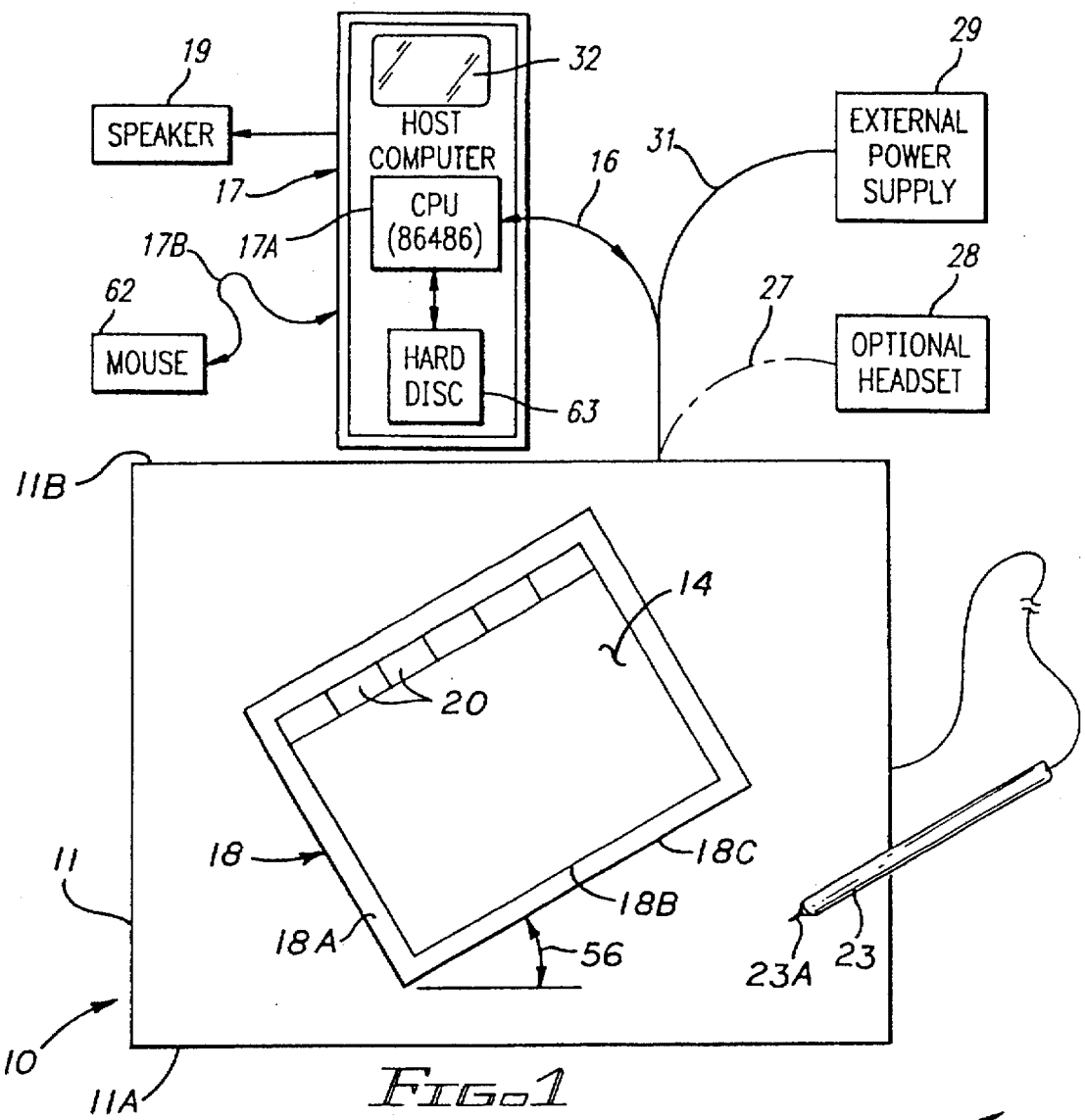
FIG. 1 is a diagram of a "student station" including a computerized digitizer/screen tablet adapted for teaching handwriting skills and connected to a "teacher/parent station" including a host computer.

Referring to FIG. 1, handwriting analysis/training station 10 (also referred to as "student tablet 10"or simply "table 10") includes a desk-top-sized plastic housing 11 which is approximately 330 millimeters deep by 355 millimeters wide and 14 millimeters high (sufficient to support the user's arm). A digitizer/screen assembly 18 is mounted within housing 11. Headset or speaker 28 is connected by a cable 27 digitizer/screen assembly 18. Digitizer/screen assembly 18 has a digitizing and display surface 14 which is 5 inches by 8½ inches. An upper ½ inch wide strip of digitizing surface 14 includes a number of "button" areas 20 which can be selected by touching them with a digitizing pen such as 23 shown in FIG. 2.

The digitizer/screen assembly 18 is mounted inside of housing 11 and includes a digitizer tablet 18A. Digitizer/screen assembly 18 also includes a thin LCD screen 18B supported on the digitizing surface of digitizer tablet 18A. As indicated in the block diagram of FIG. 2A, LCD screen 18B can be a model 5509 or 5510, available from Sanyo of Mountain View, Calif.. Digitizer tablet 18A contains a microprocessor chip 60 (a model ADSP2105 available from Analog Devices, Inc.) including internal memory and parallel communications ports and built-in graphics firmware to drive the display. Digitizer tablet 18A can be identical or very similar to a CalComp Drawing Slate 31090 six inch by nine inch tablet, and also includes a memory module 61, which can be a one megabyte model SIMM, available from Samsung of California.

The housing 11 of tablet 10 is composed of high impact plastic designed to cushion the interior electronics constituting digitizer/screen assembly 18 and associated circuitry. Preferably, a high impact Lexan cover on top of display surface 14 protects it from ordinary abuse by children.

The student presses the tip 23A of digitizer pen 23 against thin LCD display 18B. Note that surface 14 of digitizer/screen assembly 18 is referred to hereinafter either as "digitizer surface 14" or "display 14" because the digitizing surface of digitizer tablet 18A is able to accurately measure all of the pen parameters "through" the thin LCD display 18B. Student tablet 10 thus functions simultaneously as a display and digitizing tablet wherein the student, in effect, "writes through" the LCD display 18B onto the digitizer tablet 18A. Use of this arrangement can sometimes avoid the need for the student to look up from the writing surface to a separate display screen, and can be very beneficial to improving the student's handwriting skills. (Note that the technique of mounting a thin LCD display unit on a digitizer surface is a commonly used technique in digitizer tablets for use with digitizer pens.)

Digitizer tablet 18A is capable of accurately digitizing the pen tip pressure, pen tilt, pen height (altitude), x,y coordinates of the tip 23A of pen 23, and timing for each pixel of digitizing surface 14 approximately 60 to 100 times per second. A cable 16 is connected between the parallel communications port of digitizer tablet 18A and the parallel communications port of a host computer or teacher/parent station 17, which can be an IBM PS/2 Model 77, Apple MACINTOSH POWERMAC 6100 or the like, to communicate such pen data to host computer 17.

In FIG. 1, the front edge 18C of digitizer/screen assembly 18 is at a 30 degree angle indicated by arc 56 relative to the front edge 11A of housing 11, for right-handed writers. Tablet 10 can be rotated 90 degrees clockwise for use by left-handed writers.

Housing 11 is designed to provide an adequately large writing surface for the student and to position digitizer/screen assembly 18 correctly between the side edges of housing 11 with respect to the location of the student's body. Housing 11 also provides the optimum writing surface orientation for both right-handed and left-handed students.

A printer (not shown) also can be connected to the parallel port of host processor 17, using a conventional splitter.

Host computer 17 runs software that displays suitable animation images and also generates sounds for an interactive tutorial including a curriculum to teach handwriting skills. Lesson information appropriate for the present student is displayed on host computer 17 and, as appropriate, also on student tablet 10. (The stored curriculum includes approximately a thousand lessons taken from what are deemed to be the best, most effective handwriting skill-building curriculum sources.) Pen parameters produced by all handwriting motions/strokes by the student are "captured" by the digitizer and the Analog Devices ADSP2105 microcomputer in digitizer/screen assembly 18, including the x,y location of the tip of pen 23, the height of the pen tip above digitizer surface 14, the finger grip pressure on the body or barrel of pen 23, the amount of tilt of pen 23, the pressure of the pen tip on the digitizer surface 14, and the data capture time for every pixel.

The "pen tilt polar direction", or azimuth, which is the polar coordinate angle of the intersection of a vertical plane containing the axis of digitizer pen 23 with the digitizer surface 14, then is computed using the raw pen data for each pixel. Note that the term "measure" as used herein is intended to encompass the "determination" of digital values of all of the pen information and parameters, including the x,y coordinates of the pen tip 23, the pen tip pressure, the pen tilt angle, the tilted pen polar coordinate direction or azimuth, the pen tip height above the digitizing surface 14, the finger grip pressure, and the "time stamp" data (i.e., the data capture time assigned to the data) for each pixel, regardless of whether or not a pen parameter is computed by tablet 10 or a host computer 17. All of this data, and also computed values of pen tip pauses, pen tip velocity, pen tip acceleration/deceleration, etc. are intended to be encompassed by the term "pen data" or "captured pen data".

The handwriting skill-building program (subsequently described with reference to the flow charts of FIGS. 5, 6, 7, 7A, 7B and 8) is executed mainly in host computer 17 and uses the pen data captured at each pixel (point) traced by the pen tip to compare the real time digitized pen stroke parameters to corresponding stored "ideal" or normal pen stroke parameters for each pixel and then supplies "on the spot" corrective audible and/or visual feedback information to the student via speaker 19, headset 28, host computer display 32, and/or display/screen assembly 18 on which the student is "writing". The "ideal" or "normal" pen stroke parameters may be entered as curriculum data by the teacher and used as the basis for generating the feedback information. Or, the feedback information could be based on past performance of the student or the norms or "target" information. (It should be understood that whether particular portions of the program are processed in host computer 17 or student tablet 10 is made mainly on the basis of how rapidly feedback information is to be provided to the student and where it is needed (i.e., at student tablet 10 or at host computer 17), and the location of available memory space.)

For example, the handwriting training program may recognize (in accordance with the stored handwriting lesson curriculum) that the pen tilt angle should not change dramatically with regard to the digitizing surface if the pen is being moved correctly by the student. That is, the student should not significantly vary his or her wrist angle during writing. Instead, the whole arm and wrist should move in unison. Erratic y-axis angles indicate undesirable "wrist wriggling", and also may indicate the pen is being held incorrectly. In any case, the handwriting analysis program detects such conditions from the captured pen data and produces suitable audio and/or video feedback to the student at the most beneficial time.

As another example, the force exerted on the pen tip can be an important indication of handwriting "process problems" being encountered by the student. Too much pen pressure may be an indication of improper holding of the pen. Digitizer pen 23 also can include "side switches" or transverse pressure transducers that indicate the forces with which one or more fingers of the student grip the shank of digitizer pen 23. U.S. Pat. No. 5,004,871 (Purcell) issued Apr. 2, 1991, entitled "DIGITIZER STYLUS HAVING SIDE SWITCH", and incorporated herein by reference, discloses such a digitizer pen which could be used. The handwriting analysis program detects inappropriate pen tip pressure and/or inappropriate pen gripping forces and, in response thereto, generates appropriate audio and/or visual feedback and delivers it to the student at the most beneficial time.

Preferably, host computer 17 operates in accordance with WINDOWS, MAC, or 3DO operating systems or the like to make user interface easier, and also operates to execute "curriculum script" which can be developed on host computer 17 or an external computer by a person creating the curriculum and then loaded into a curriculum script file 101A (FIG. 6).

The curriculum script includes "movie objects" (also referred to as video objects), and "sound objects" which the person creating the curriculum can easily develop using a program such as DIRECTOR, available from Macromedia (of San Francisco, Calif.). The curriculum script also includes an ASCII "script" which can be externally produced by the person creating the curriculum by using English-like words with an ordinary text editor.

In the presently preferred embodiment, the program DIRECTOR may be used in host computer 17 or a different computer to create the various movie objects and sound objects. These objects specify the images that constitute the movie objects, and also specify the information which constitutes the sound objects. An ordinary text editor is used by the curriculum creator to create an ASCII file which includes the information needed to determine the sequences of the various movie objects and sound objects generated by the person creating the curriculum using, for example, the DIRECTOR program and the text editor. The entire curriculum script, including the objects created using DIRECTOR and the ASCII script produced from English-like words using the text editor then can be loaded into curriculum script file 101A (FIG. 6) in host computer 17. Main program 100 of FIG. 6 includes a compiler-like routine that converts or compiles the curriculum script into object code executable by the microprocessor of host computer 17. The English-like script and the objects can be read by the main program 100 (FIG. 6) to execute "playing" of the movie objects and sound objects according to the selected lesson or user instruction.

The curriculum script includes a relatively large number of handwriting lessons each of which includes a large number of video objects, sound objects, and English-like script. Each video object represents a sequence of images which, when displayed in rapid sequence, appear as video images, and a corresponding sound object is played in synchronization with such video images. As subsequently explained, the video objects can include both full-screen image frames and partial-screen image frames. The partial-screen image frames contain mainly areas in which an image or a part of an image has changed from the preceding image frame, and exclude image areas which are unchanged relative to the preceding image frame. In accordance with the present invention, the video objects are composed of as many partial-screen image frames as is practical, and each partial-screen image frames is made as small as practical, so as to exclude unchanged pixel data from the image data to be transmitted from host computer 17 to tablet 10.

The program DIRECTOR includes a "player" option that can be executed to read files created by DIRECTOR to actually "play out" the developed script after it has been stored in host computer 17. A very similar, but faster "player" program is included in main program 100 of FIG. 6 and is executed by host computer 17 to effectuate satisfactory sequencing, blending, and fading of the developed and then stored curriculum script.

As an example of a particular handwriting lesson, the display of host computer 17 (which functions as a "metaphor" for a classroom blackboard) shows an "animated" classroom with a teacher writing on a blackboard. The scripting program causes host computer 17 to generate an animated figure and associated voice sounds that explain the present lesson. Information from the selected lesson is downloaded into tablet 10, whereby the animated figure (e.g., "Dexter Dog") then "jumps" from the display of host computer 17 into and slides down a tunnel or the like, seems to disappear from the screen of host computer 17, and then reemerges from the bottom of the tunnel on the LCD display screen 18B of tablet 10 (which displays black lines on a white background so as to simulate writing paper). The animated figure then may draw the particular alpha or numeric characters or strokes which are the subject matter of the present lesson on the digitizing/display surface 14. The accompanying voice sounds are emitted from speakers 19 of host computer 17. The student then is prompted to write the characters or strokes on the digitizing/display surface 14 using digitizing pen 23.

As the student attempts to "write" the prompted characters or strokes, the digitizer samples pen parameters (at a rate of approximately 60 to 100 samples per second), and the handwriting analysis program analyzes all of the sampled pen x,y coordinate, height, tilt, pen tip pressure, timing data, and computed pen tilt polar direction for any pixel, and then detects any "major" errors, "moderate" errors, and "minor" errors in accordance with preestablished deviation limits from the stored "ideal" characters or strokes.

Immediate audible feedback information then is delivered to the student if gross errors, such as the pen tip being inappropriately lifted or being "out of bounds", are detected. If lesser deviations are detected, appropriate corrective feedback may be delivered at the end of the present stroke or at the end of the present line, "word", or lesson for less serious or "minor" deviations. The student's pen data is accumulated and stored to update the profile of the present student.

The pen data and its "timing" for each pixel of each stroke, and pen tip acceleration and deceleration, pauses and the like which are computed from the "time-stamped" raw pen data for each pixel, are compared to corresponding stored parameters for "ideal" or "reference" strokes, characters, etc. The stored "ideal" or "reference" pen stroke parameters may have been generated on the basis of stored measurements produced by a large number of people, such as teachers having good "reference" handwriting, by using the handwriting training system of the present invention. The reference stroke parameters also could be established by past performance of the present student, or they may be generated in some other way. In any case, a normal or "reference" profile for each student is maintained and updated as that student's skills improve.

The result information generated by the handwriting analysis program is used to generate immediate corrective feedback for the most common errors. Such feedback is in the form of audible information via host computer speakers 19 and/or image information on host computer display 32 and/or tablet display surface 14. For uncommon errors, result information produced by the handwriting analysis program is sent to host computer 17, and corrective information can be dynamically downloaded back into tablet 10 to produce corresponding images on tablet display 14. The student's handwriting history is updated and stored in student database 103 (FIG. 6) by host computer 17, where it can be accessed by host computer 17 and hence is readily available to the teacher or parent.

Upon request, host computer 17 can display the characters previously written by the student along with the associated pen parameters. The pen tilt angle and pen tilt direction during each stroke also can be displayed. Incorrect timing, out of bounds pen tip positioning, overly abrupt stroke terminations and the like also can be displayed, so the teacher can demonstrate graphically to the student information that indicates where efforts to improve should be focused. This "playback" or "demonstration" capability feature is very useful for teachers in explaining a student's progress/problems to parents. A student database manager (module 251 in FIG. 5) can present options on a menu from which the teacher can select and display such information as he or she deems appropriate.

It should be understood that for students unfamiliar with the alphabet, the above described system can execute a program that gradually displays the various alphanumeric characters (or other types of characters or images) to the student and prompts him or her to identify the characters, using verbal prompting through host computer speakers 19 to touch pen tip 23 on various characters/images displayed on digitizer/screen 14. Further instruction also can be provided, illustrating to the student how the pen should be properly held, using both graphic and audible prompting.

Figure 2:
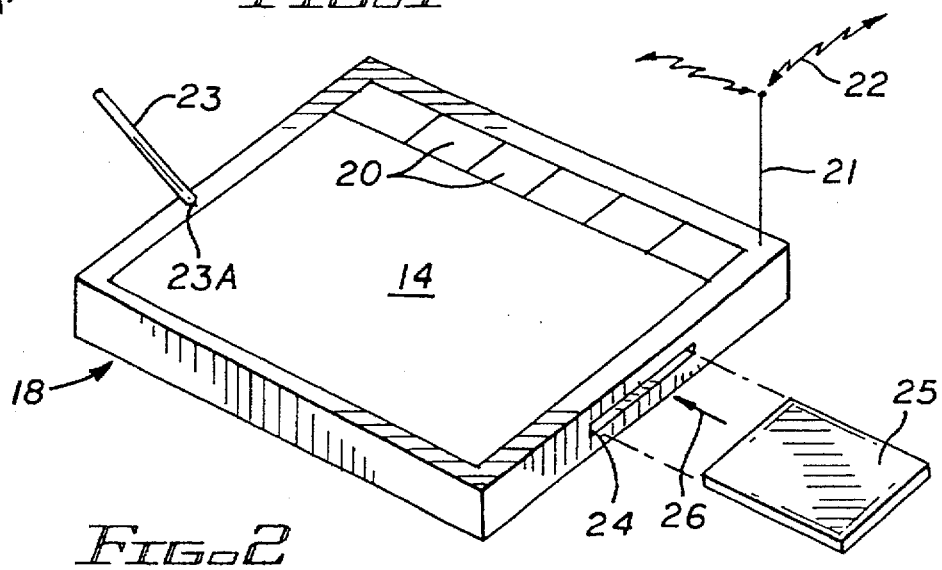
FIG. 2 is a perspective view of a digitizing tablet and pen including a wireless communication interface.
Figure 2A:
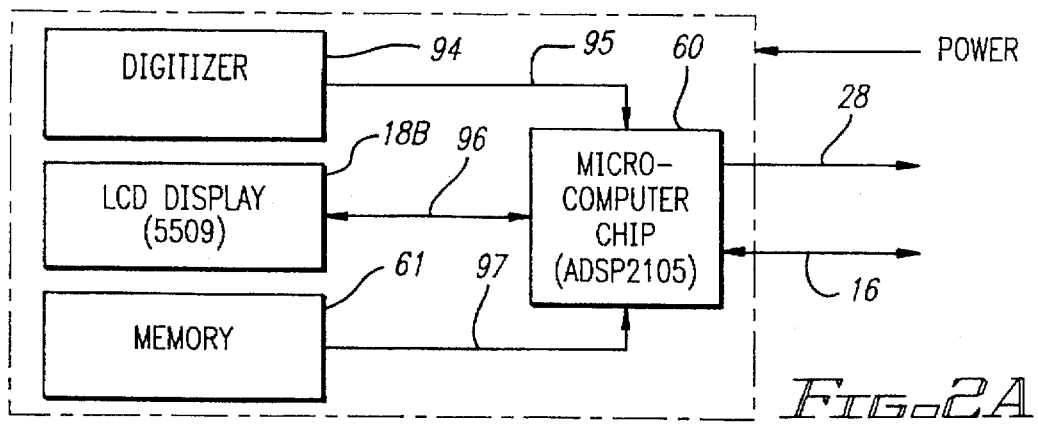
FIG. 2A is a block diagram of the digitizer 18 shown in FIG. 1.

Referring to FIG. 2, a modified digitizer/screen assembly tablet 18A includes wireless communication capability (using "radio" signal coupling) designated by antenna 21 and wireless signals 22. (Infrared wireless communication also could be used.) Digitizer/screen assembly 18 includes a slot 24 into which PCMCIA memory cards such as 25 can be inserted as indicated by arrow 26. Such cards are currently capable of storing 20 to 30 megabytes of information (which is adequate for presently foreseeable applications of the invention), and could store the handwriting analysis program, student profiles, and all other associated software.

Figure 3:
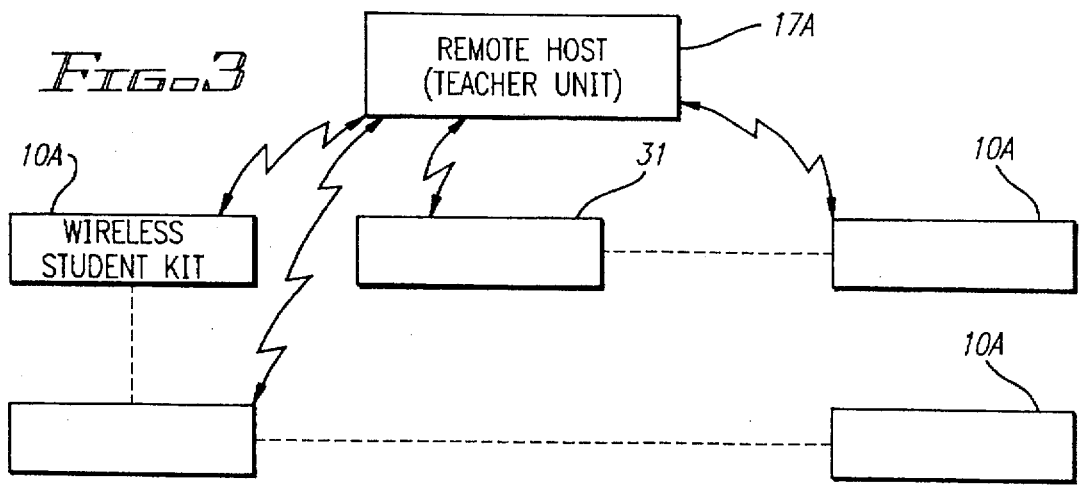
FIG. 3 is a diagram of a classroom including a teacher station coupled by wireless communication to a plurality of the student stations of FIG. 2.

FIG. 3 shows a remote host computer 17A functioning as a teacher unit and a number of separate wireless student units 10A each including the wireless digitizer/display assembly 18A of FIG. 2 disposed in housing 11 as shown in FIG. 1. The above system can be constructed at a sufficiently low price that it can be marketed to schools. A single "system" including a teacher unit host computer such as 17A in FIG. 3 and a number of wireless student units 10A can be stored in a suitable mobile cart and conveniently rolled to different classrooms at different times of the day.

Figure 4:
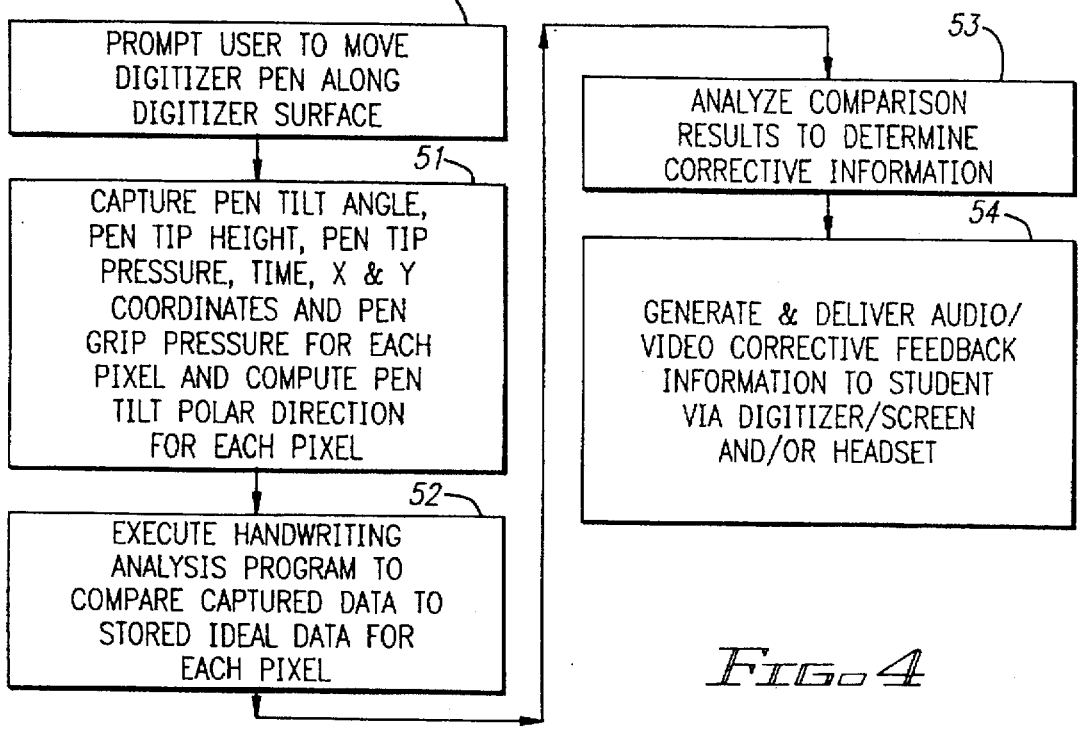
FIG. 4 is a generalized flow chart useful in explaining the basic operation of the embodiment of the invention shown in FIGS. 1 and 2.

It will be helpful to now refer to FIG. 4, which is a flow chart illustrating the general operation of host computer 17 as it executes the handwriting analysis program. As indicated in block 50, the program first prompts the user to move digitizer pen 23 along the digitizing surface 14. Next, student tablet 10 digitizes the pen tilt angle, pen tilt direction, pen tip height, pen tip pressure, x,y coordinates, finger grip pressure, and time of measurement (i.e., the "time stamp") for each pixel, as indicated in block 51.

The handwriting analysis program in host computer 17 then compares the above pen data, including various computed pen parameter(s) (i.e., accelerations, pauses, times, etc.), to that of stored "ideal" or "reference" data for each pixel, and, in block 53 analyzes the results of that comparison to determine appropriate corrective information to be delivered in visual and/or audible form to the student. Then, as indicated in block 54, the analysis program causes host computer 17 to generate and transmit appropriate audio and/or video corrective feedback information to host computer speakers 19 and display 32 or the tablet display 14. For example, immediate audio feedback messages could include the animated character Dexter Dog saying "You've put the pen in the wrong location. Put it down at the blinking spot", or "You're pushing too hard on the pen. Press gently". An intermediate audio feedback message might be "You made that line from bottom to top. Let's make it from top to bottom. Try again". An example of an end of line audio feedback message is "That line is slanted down to the right".

Figure 5B:
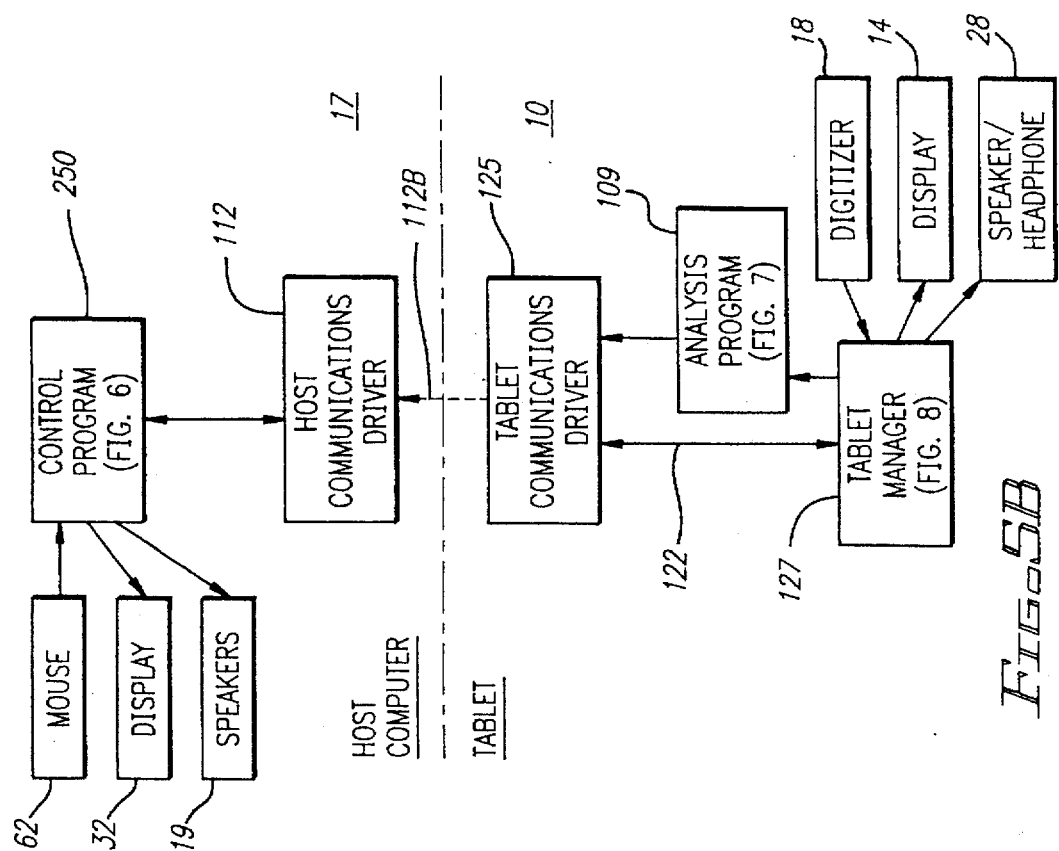
FIG. 5B is a flow chart useful in describing the processes performed in host processor 17 in another embodiment of the tablet.

FIG. 5 shows an operational flow chart of an embodiment of the invention in which tablet 10 is connected by parallel bus 112A to a parallel port of host computer 17. In this embodiment, tablet 10 includes both digitizer 18 and tablet display 14, although tablet display 14 is optional, as indicated by dotted line 34; all display images can be provided on host display 32 if display 14 is not provided on tablet 10.

The program executed by host computer 17 includes above mentioned student manager module 251, which can send information to and, upon request, receive information from curriculum script file 101, and also can send information to and receive information from student database storage 103. A control program 250 can retrieve selected lessons from curriculum script file 101 and load information into and also retrieve information from student database 103. Control program 250 also can receive control information from mouse 62, send display information to display monitor 32 or a printer (not shown), and can send audio information to speakers 19. Control program 250 also sends information to tablet 10 via host communications driver subroutine 112 and also receives information therefrom via parallel data path 112A. Analysis program 109 performs the function of comparing the digitized pen data for each pixel with corresponding data of corresponding points of reference strokes retrieved from curriculum script file 101 in accordance with the present lesson plan, which is retrieved from curriculum script file 101.

Tablet 10 executes a tablet manager program 127, which mainly performs the functions of "time-stamping" and receiving raw digitized pen data via path 258 from digitizer 18, and also sends information to optional tablet display 14 (if tablet display 14 is included in tablet 10). Tablet manager program 127 communicates via bi-directional data path 257 with tablet communications driver subroutine 125, which in turn communicates with host communications driver 112 via parallel communications bus 112A according to a suitable handshaking data transfer protocol.

Curriculum script file 101 contains every stroke of every letter of every lesson which can be "taught" by the system operation illustrated in the flow chart of FIG. 5. As previously mentioned, one way of providing curriculum information for curriculum script file 101 is to have skilled handwriting teachers utilize student tablet 10 and digitizing pen 23 (FIG. 2) to enter every reference stroke of every letter of every lesson into curriculum script file 101 via digitizer 18, tablet manager program 127, parallel port or bus 112A, analysis module 109, and control program 250.

Student database 103 initially is empty. Every time a student performs a lesson tablet 10, all of the resulting pen data processed by analysis program 109 (as subsequently explained with reference to FIG. 7) is added to student database 103.

In the manner previously explained, the animated character Dexter Dog might be displayed by control program 250 on host computer display 32 to initiate a particular lesson drawing a character on host display 32. Control program 250 then might cause the animated character to appear to "jump" from the host screen to "magically" appear on tablet display 14 to continue the prompting of the student. Control program 250 might also cause the animated character to "jump" back and forth between tablet display 14 and host computer display 32 so as to direct the student's attention back and forth between host computer 17 and tablet 10 as appropriate.

Tablet 10 "captures" all of the pen data digitized by digitizer 18 and sent to tablet manager program 127. This pen data includes pen tip x,y coordinates, pen tilt angle, pen tilt direction, pen tip height above the digitizer surface, pen tip pressure, and finger grip pressure. Tablet manager 137 adds a "time stamp" to the pen data received from each pixel indicating when that data was measured or captured so analysis program 109 can process and/or "replay" all of the pen data in chronological fashion. The "time stamp" also is associated with any computed "pen data".

In the present embodiment of the invention, the raw data is transmitted directly to analysis program 109 via communications driver subroutines 125 and 112, although various data filtering techniques or the like could also be provided by appropriate hardware and/or software in tablet 10. (Both host communications driver subroutine 112 and tablet communications driver subroutine 125 execute data formatting and handshaking protocols that allow two-way data communication via parallel bus 112A (or a wireless link if that is used) between host computer 17 and tablet 10.)

Basically, the main function of analysis module 109 according to the present invention is to compare the raw pen data and computed pen parameters being produced in response to digitizing pen 23 to corresponding reference data in accordance with the present lesson retrieved from curriculum script file 101 and input to analysis program 109.

Student manager program 251 ordinarily would be run as an off-line batch program in response to a request or menu selection by the teacher to, for example, collect all of the pen data for each student who has performed a lesson, compare that pen data to corresponding previously stored pen data for that student in database 103, compare such pen data and parameters to corresponding data for other students who have completed the same lessons, and use various criteria to evaluate the progress of each student, identify students who need additional help, etc. Student manager program 251 also can be set up to perform various other functions, such as identifying groups of students according to various criteria and perform statistical analyses, and print out reports containing such information.

Upon request by the teacher, control program 250, in conjunction with student manager program 251, can precisely "replay" and display the student's original pen data for any portion of any lesson already performed by the student to help demonstrate and identify the student's processing errors.

Figure 8:
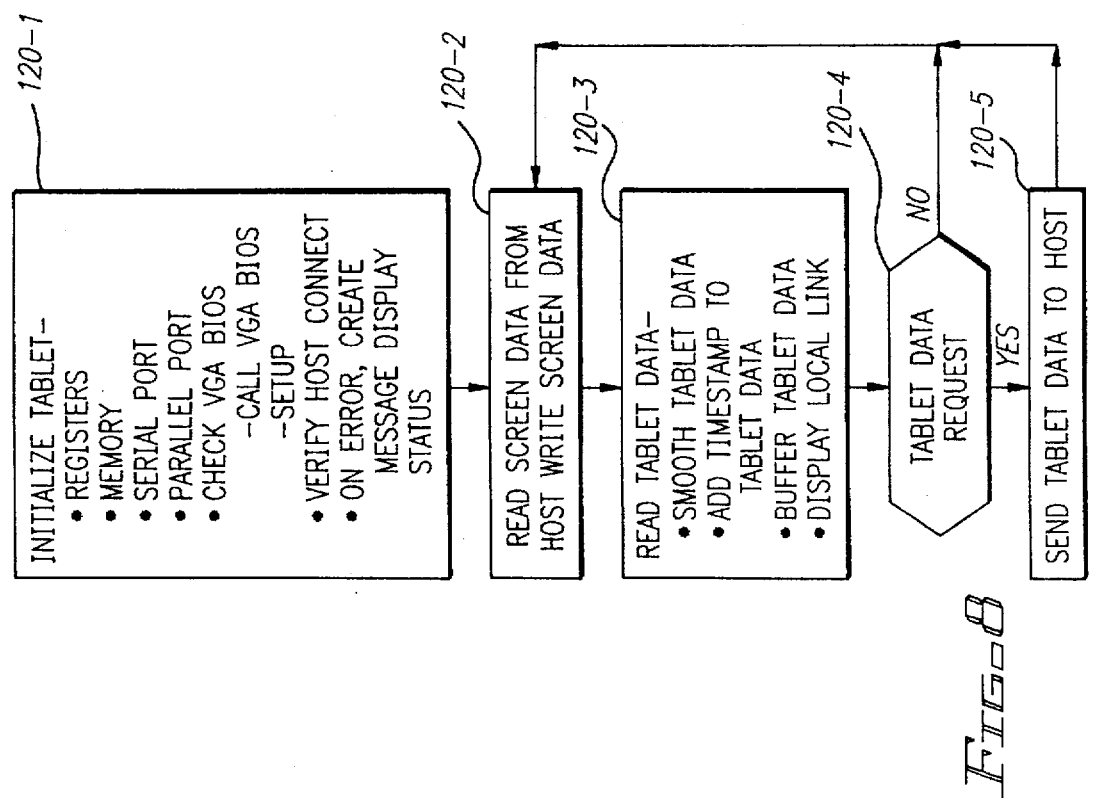
FIG. 8 is a flow chart of block 120 of FIG. 6.

As indicated in block 120-1 of FIG. 8, tablet manager program 127 first initializes its internal registers, memory locations, and parallel port 112A. Tablet manager program 127 also determines if tablet 10 is connected to a valid port of host processor 17, to read the display screen parameters to determine the number of rows and the number of dots per inch across the screen and other basic hardware setup information, and to generate and display any appropriate error messages. Tablet manager program 127 then goes into a loop including blocks 120-2, 120-3, decision block 120-4, and block 120-5 to read screen data from host computer 17, write screen data from the host computer, write screen data as indicated in block 120-2, read tablet data (smoothing it if that option has been provided), add a time stamp to the raw pen data for each pixel, display information in accordance with the curriculum data of the present lesson on tablet display 14, and buffer tablet data, as indicated in block 120-3.

In decision block 120-4, tablet manager program 127 determines if there has been a tablet data request by control program 250. If the determination of decision block 120-4 is affirmative, tablet manager program 127 sends the next available tablet data to host computer 17, as indicated in block 120-5, and then return to block 120-2. A negative determination of decision block 120-4 results in returning to block 120-2. The tablet manager program then goes from block 120-5 to block 120-2.

FIG. 6 is a operational flow chart similar to that of FIG. 5, but more detail is provided to allow more specific explanation of the joint operation of host computer 17 and tablet 10. For convenience, the host and tablet communications driver subroutines are illustrated as a single communications module 112 in FIG. 6. In FIG. 6, the "main program" 100, analysis "object" 108, sound "object" 105, and movie "objects" 116–119 are encompassed within control program 250 of FIG. 5. (The student manager program 251 of FIG. 5 is omitted from FIG. 6, as it does not play an active role in the interaction between tablet 10 and host computer 17 as a particular lesson is performed by a student.)

In FIG. 6, main program 100 consists of a subroutine that reads the script code for each lesson from script parser file 102. The script in curriculum script file 101A specifies all of the movie objects (111–119) and corresponding sound objects 105 of each lesson. Main program 100 coordinates or "plays" these various objects so as to produce the needed images and associated sounds on the host computer display 32 and host computer speaker 19, and also downloads selected sound and movie objects to tablet 10 via path 111A and communications driver 112, to thereby present the present lesson exactly as set forth in curriculum script file 101A.

Main program 100 of FIG. 6 includes an interrupt-driven idle loop including a number of interrupt-driven software structures which control the playing or flow of the various movie objects (each of which may include various movie sub-objects that occupy only a specified "changing" portion of the display screen area) and sound objects according to the curriculum script file 101A for the presently selected lesson or the present user command.

Main program 100 also may include non-interruptible software structures to prevent interruption of playing of certain long sequences of movie objects (and movie sub-objects thereof) and corresponding sound objects that need to be synchronized. (For example, playing a sequence of movie sub-objects that cause Dexter Dog's lips to move must be synchronized with playing of the sound object consisting of the words Dexter Dog is speaking.) The non-interruptible software structures can not allow the otherwise interrupt-driven idle loop to be interrupted in a way that destroys such synchronization between the playing of movie objects and the playing of corresponding sound objects. The non-interruptible software structures also prevent interruption of ongoing processing of raw pen data received from digitizer 18 (FIG. 6), so that pen input can be processed as rapidly as possible. One skilled in the art can produce various suitable idle loops to produce the necessary function of main program 100 without undue effort and experimentation; Appendix 2 includes a presently preferred implementation.

Curriculum script file 101 as shown in FIG. 5 is more accurately depicted in FIG. 6 as curriculum script file 101A together with reference stroke/character database 101B. Curriculum script file 101A stores the entire curriculum, that is, all of the handwriting lessons, which can be "taught" or managed by host computer 17. Appendix 1 hereto illustrates an example of script code for the lesson of writing the letter "A". Curriculum script file 101A would contain hundreds of such scripts to provide various lessons. For example, the language "open intoclas.rle", "open chals.rel", "class 2bd.rle", "show lesson 1" of the curriculum script for the selected lesson is interpreted by main program 100 to cause it to display the animated character in a classroom at a blackboard and conduct the lesson, writing an "A", and prompting the student to write it as instructed. Main program 100 interprets the subsequent code in Appendix 1 to compare the student's response in attempting to write "A" four times on tablet 10, and displaying images indicative of any errors.

Reference stroke/character database 101B contains all of the reference or "ideal" stroke/character information for each pixel of each character which has been previously stored, so that such information can be compared on a pixel-by-pixel basis with corresponding pen data from the pen strokes made by the student on digitizer 18 of tablet 10.

The script parser 102 of FIG. 6 reads curriculum script information, each lesson of which is selected by its title in proper sequence from curriculum script file 101A and brings it into main program 100. Main program 100 also updates student database 103 with all pen data and computed pen parameters produced for the student during each lesson. Main program 100 also can access student database module 103 to "replay" the student's strokes, beginning at any requested time. Main program 100 can access reference stroke/character database 101B as needed to provide corresponding pen data to which present pen data being produced by the student can be compared on a pixel-by-pixel basis.

Script parser 102 is a conventional type of program that utilizes "script language" to identify particular lessons in curriculum script module 101A. This allows a person developing a lesson curriculum to quickly develop an English language format which can be used to access the various types of reference stroke/character information so that corresponding script information and reference stroke/character information from module 101B are provided as needed by main program 100 to perform the "handwriting teaching" function.

For example, the curriculum to teach a student to write the lower case letter "a" requires two strokes, including a circle to the left and a short vertical line abutting the right side of such circle. The curriculum to teach the student to write the letter "a" might include main program 100 displaying the animated character (Dexter Dog) drawing an "a" on host computer display 32 and explaining how to do it. Main program 100, using the above mentioned "scripting" program, would generate corresponding sounds synchronized with the movement of Dexter Dog's lips.

Script parser 102 allows use of English words as the program input to main program 100 to cause it to execute the foregoing sequence and to cause it to analyze the raw data produced in response to the student's use of digitizing pen 23. Script parser 102 is a program that reads "English-like" words and keywords which have been placed into a simple ASCII text file by the curriculum developer program. These keywords and associated logic cause main program 100 to display pre-recorded information, play pre-recorded sounds, request input information from the user and analyze such input information, and branch accordingly. Branching occurs within execution of the ASCII script in response to input from the student and conditional branching instructions within the object code generated by main program 100 as a result of interpreting the ASCII script. The script words are "English-like" so that a trained curriculum developer can easily enter them.

Script parser 102 can avoid the need for the lesson developer to write programming code to create the sound objects and various movie objects in order to create a program of sounds and movements by the animated character, and instead allows him or her to use English script words.

The "movie objects" (also referred to as "video objects") and "sound objects" of FIG. 6 are "object level programs" or subroutines each of which can produce a predefined sequence of sounds or a predefined sequence of movements of a displayed image. Script parser 102 allows sound sequences to be coordinated with selected movie objects. Some of the movie objects are directed to "write" displays onto host computer display 32, while others are directed to "write" displays onto tablet display 14 or plays sound objects or prompts the student to provide an input.

An analysis object corresponding to block 108 of FIG. 6 can be considered to be an "electronic image" or "movie object" of reference strokes/characters or electronic images of strokes/characters captured from digitizer 18 by tablet manager program 127 (or retrieved from student database 103) and presently being analyzed by analysis program 109. In any case, main program 100 operates to manipulate such sound objects, movie objects, and analysis objects, rather than the raw data of which such objects are constructed, in accordance with the instructions received from curriculum script file 101A via script parser 102.

Analysis program 109 performs the function of comparing pen data based on raw data from digitizer 18 (including pen parameters computed from the raw data) with corresponding reference data from reference stroke/character database 101B on a pixel-by-pixel basis and supplying the comparison results to analysis object module 108, which then creates a corresponding "object" that is then sent via path 110 to main program 100.

It should be appreciated that parallel port data communications rates for presently available low cost computers of the type that would be used for host computer 17 are too slow to allow host computer 17 to transmit all of the animation character (Dexter Dog) image data to tablet 10 via a parallel port that is needed to implement a typical curriculum script to teach handwriting. It is believed that the technique of using a personal computer such as an IBM PS/2 (or compatible) or a MACINTOSH POWERMAC 6100 (or compatible) PC as host computer 17 to send animated character displays to tablet display 114 via parallel port 112A is novel, but generally would be regarded as unworkable by those skilled in the art. (As previously mentioned, various other external host ports also could be used, including serial, SCSI or PCM/CIA ports, the new Microsoft Plug and Play port, or other "non-video" ports. The foregoing considerations are equally applicable to them as to the parallel port of the described embodiment.)

However, according to the present invention, this is accomplished by sending movie objects via the slow parallel port 112A only in the form of compressed screen "update" data. Microsoft's RLE (run length encoded) standard compression scheme can be used. Also, instead of updating the entire screen of tablet display 14 to show each animated character movement, only the portions of the animated image that have changed from the last screen are transmitted to tablet 10 via slow parallel port connection 112A. Then, animated cartoon movement can be accomplished on tablet display 14 by updating anywhere from a few to all of the points of an entire screen. For example, the scripting read from curriculum script file 101A in FIG. 6 might require the animated character Dexter Dog to raise his "hand". This can be accomplished by a timed sequence of frames, all of which are identical to the previous frame except for a rectangular area in which the location of the "moving" hand is slightly different from the previous frame. The scripting from curriculum script file 101A identifies that rectangular area as being the only portion of the frame that has changed. Main program 100 recognizes that and transmits only the pixel data and pixel location information of that rectangular area (formatted in the above compressed data format) to tablet 10 via communications driver 112. Tablet 10 then updates the corresponding pixels of tablet display 14.

Figure 7:
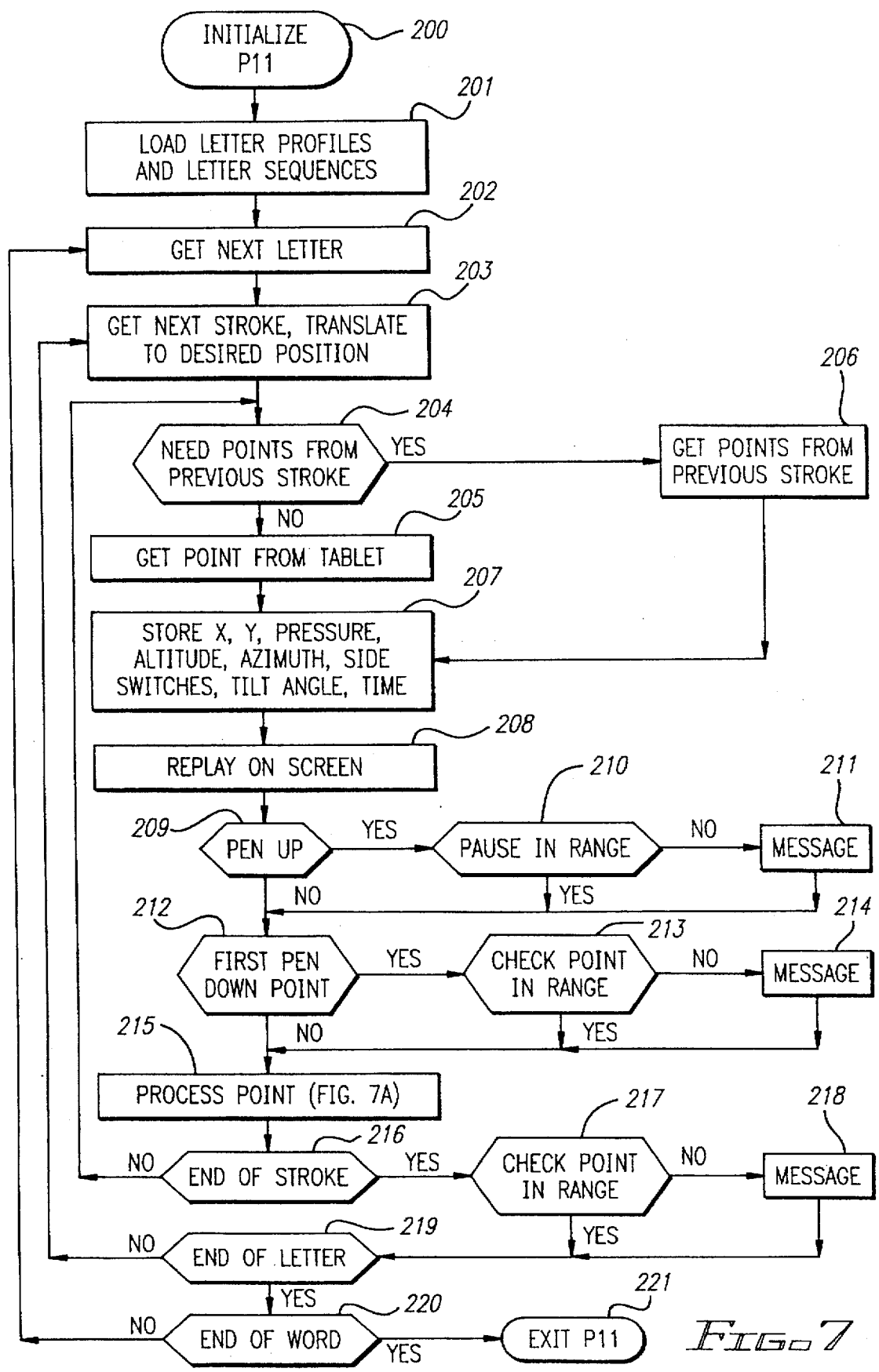
FIG. 7 is a detailed flow chart of block 109 of FIG. 6.
Figure 7B:
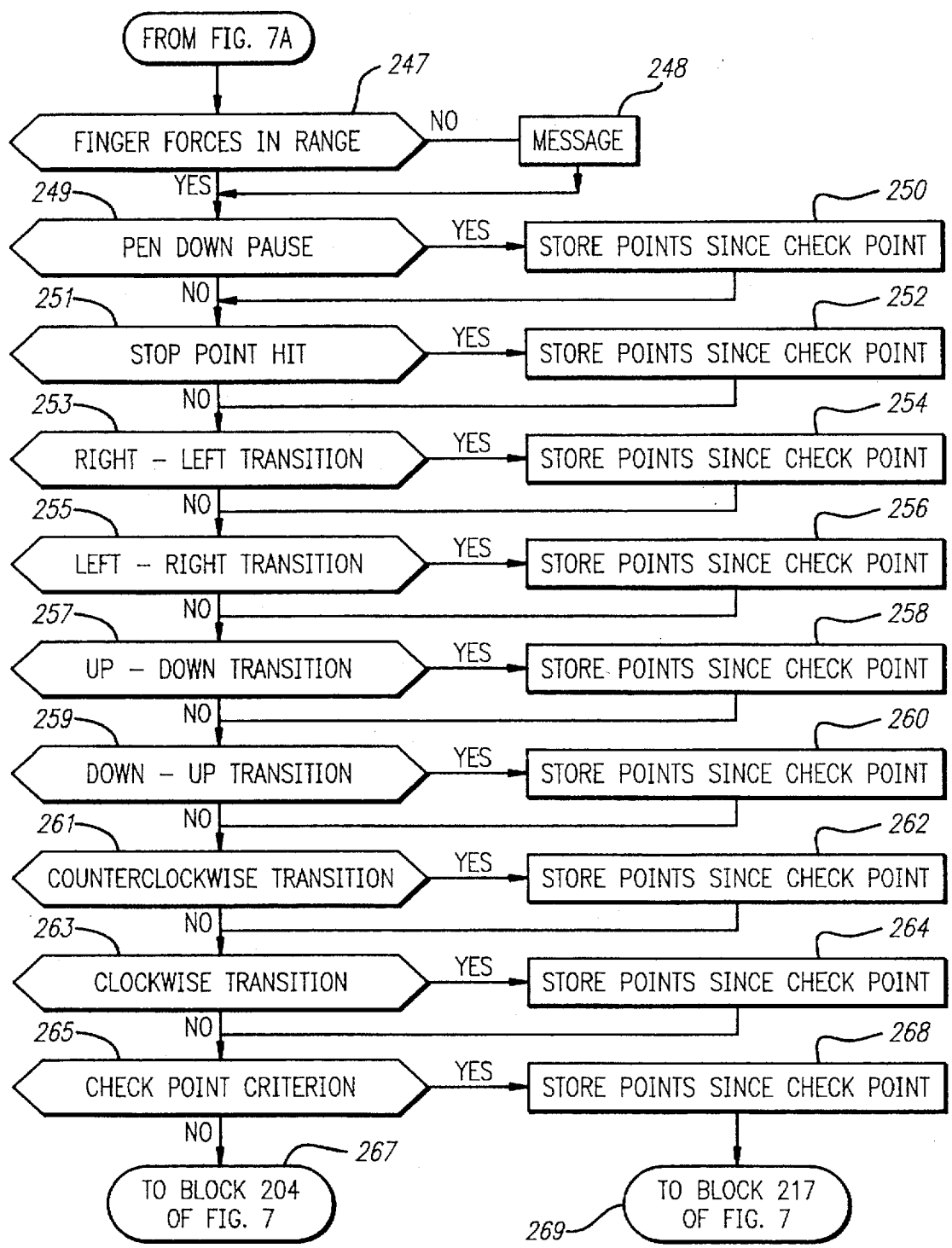
FIG. 7B is a detailed flow chart of block 216 of FIG. 7B.

The analysis program 109 of FIG. 6 is shown in FIGS. 7, 7A, and 7B. When this program is entered at label 200 in FIG. 7 it performs various initialization tasks and then loads the "letter profiles" and "letter sequences" from the lesson selected from curriculum script file 101A along with corresponding reference strokes/characters from database 101B in accordance with instructions of script parser 102 and main program 100, as indicated in block 201. In block 202, the analysis program selects the next available letter from the curriculum script file 101A, as indicated in block 201, selects the next available stroke of the present letter, again from the curriculum script file 101A, and then translates it to a desired location on the display screen, as indicated in block 203.

Next, in decision block 204, the analysis program determines if it is necessary to refer to data from points (pixels) of the previous stroke. The "pen tilt direction" (also referred to as the "azimuth") is the polar coordinate angle of a plane vertical to the digitizer surface of tablet 10 and passing through the axis of tilted digitizer pen 23, and it and the pen tilt angle are easily determined from the raw pen data. If the present stroke is a "curved stroke", then the pen tilt polar direction will be changing as the stroke progresses.

It should be understood that the term "stroke" as used herein refers to a "line" being written or drawn wherein there is no change of average line direction of more than 90 degrees. The change in average direction of the stroke being written is taken over a suitable distance (e.g., three samples taken 30 milliseconds apart over at least one fortieth of an inch) to avoid minute, random "jiggles" or "jitter" in the stroke, regardless of whether it is caused by the student or the digitizer, from being interpreted as sufficiently large direction changes to represent the end of stroke.

In order to determine if the curvature of the present stroke being performed by the student using the digitizing pen 23 is appropriate, it is necessary to use data from a number of previous points (since the last check point) of the stroke which, as subsequently explained with reference to FIG. 7B, are stored at various locations in response to any affirmative determinations of the various decision blocks 249, 251 . . . 263. Decision block 204 determines, on the basis of information supplied from the curriculum script for the present lesson, whether it is necessary to get the next point required in the analysis from the previous stroke or from tablet 10.

In any case, the next step in the subroutine is to store the x and y coordinates of the pen tip, the pen tip pressure against the digitizing surface 14, the altitude or height of the pen tip above digitizer surface 14, the pen tilt angle, finger grip pressure information, and the time(s) at which the data for that point was digitized, which represents the time(s) at which the digitizer pen tip was at the present point. The analysis program also computes the pen tilt polar direction or azimuth.

Next, the analysis program re-displays the x/y coordinates of the present pixel data on host computer display 32, after first determining that the prior display needed modification and allowing a slight delay for such modifications. The analysis program then goes to decision block 209 and determines if the tip 23A (FIG. 2) of digitizer pen 23 is above the digitizer surface 14. If it is, the program goes to decision block 210 and determines if the present pause in the stroke is within a time range specified by the curriculum script information for the present stroke. If this determination is negative, a corrective message (which is specified in the stored curriculum script) is selected as indicated in block 210. If the present "pen up" pause is within the proper range, or if the error message of block 211 has been selected, or if the pen tip is not up, the analysis program goes to decision block 212 and determines if the present point is the "first pen down point". If it is, the analysis program goes to decision block 213 and determines if that "start point" is in the proper range specified by the selected curriculum script information for the present lesson, and generates an error message if it is not.

In any case, the analysis program goes to block 215 and performs subroutine of FIG. 7A to perform a number of check tests on the present point. In decision block 222 of FIG. 7A, the analysis program determines if the present point being drawn with digitizing pen 23 by the student is a "curved" stroke. If it is not, then the analysis program determines in decision block 223 if the moving average of the slope of the "uncurved" line is within a range established by the selected curriculum script information, and if it is not an appropriate feedback message is selected, as indicated in block 224. In any case, the analysis program next goes to decision block 225 and determines whether the variance of the slope of the "non-curved" stroke presently being drawn by the student is within a predetermined range, and selects an appropriate feedback message according to block 226 if it is not. In any case, the analysis program goes to decision block 231 to begin another series of tests.

If the determination of decision block 222 is that the present stroke is "curved", the pen data is tested to determine if the "crow slope" of the present position of the stroke is in a predetermined range. The "crow slope" of a particular point of a stroke is the angular difference between the angle of the tangent of the initial or starting point of the stroke and the angle of the tangent of that particular point of the stroke. If it is not, an appropriate feedback message is selected according to block 228, and in any case the analysis program then goes to decision block 229 and progresses through decision blocks 229, 231, 233, 235, 237, 239, 241, 243, 245, and 247. In these decision blocks the analysis program successively tests the angular velocity variance (227), the average speed (231), the speed variance (233), the average pen tip pressure on the digitizer surface 14 (235), the pen tip pressure variance (237), the average tilted pen polar direction or azimuth (239), the tilted pen polar direction variance (241), the pen tip altitude or height above the digitizer surface 114 (243), the variance in the pen tip altitude (245), and the finger grip forces on digitizing pen (247) all are compared to corresponding ranges specified by the present lesson selected from the curriculum script for present stroke for the present student. The "variance" is defined to mean the absolute value of the moving average minus the current value of the parameter under consideration, i.e., ABS (moving average-current value).

In each of these "range checks", if the variable tested in the decision block is not in the specified range, an appropriate corrective message is selected, and in each case the analysis program then goes on to the next decision block. All of these corrective messages are specified in the stored curriculum script. In practice, the curriculum script may simply include a message number identifying the desired corrective message, and the main processor 100 then interprets the resulting "decompiled" code to simultaneously display a corresponding movie object and play an associated sound object to thereby deliver the corrective message to the student.

In each case, depending upon the severity of the error, main program 100 may or may not immediately interrupt the student to deliver the feedback message by transmitting corresponding sound objects and movie objects to host computer speakers 19 and host computer display 32, or, in some cases, to tablet display 14, in accordance with the curriculum of the present lesson. For example, in the feedback message, the animated character Dexter Dog might, by means of displays 14 and/or 32 and speakers 19, display the correct manner of writing the present stroke to the student and then prompt the student to start over.

The various ranges or tolerances specified in the range check tests of FIG. 7A may be varied from lesson to lesson as the student progresses in his or her handwriting skills. The "importance" of various errors, and hence the selection and delivery of feedback messages, may vary considerably from lesson to lesson, depending on the objectives of the present lesson.

When all of the "range check" steps of FIG. 7A have been performed, the analysis program goes to block 216 of FIG. 7 and determines, by executing the program of FIG. 7B, whether the present point is at the end point of the present stroke. The first step in this process is the decision of block 249 in FIG. 7B, which determines if a pause in movement of the pen tip has occurred. If this determination is affirmative, all the pen data is captured for each pixel through which the pen tip 23 passed since the last "check point". A "check point" is a point specified in the curriculum script, and has an associated location and an associated time. For example, the letter "C", which consists of a single curved stroke, may be specified in the curriculum script by 5 consecutive check points. The pen tip 23A should pass within a predetermined "target area" or distance of the check point location and within a predetermined time interval from the time associated with the check point.

Thus, all pen data since pen tip 23 passed within the "target area" of last check point is stored if any of the determinations in any of decision blocks 249,251,253,255, 257,259, 261, or 263 is affirmative. That is, all pen data since the last check point is stored if there is a "pen down pause" (block 249), pen tip 23 is sufficiently close to a check point (block 251), pen tip 23 is undergoing a right-left transition (block 253), a left-right transition (block 255), an up-down transition (block 257), a down-up transition (block 259), a counter-clockwise transition (block 261), or a clockwise transition (block 263).

Then the analysis program goes to decision block 265 and uses the pen data stored since the last check point to determine if pen tip 23A is at the end of the present stroke.

The previous portion of the program of FIG. 7B has the effect of clarifying whether the most recent point (pixel) is a check point and storing all subsequent pixel data if the most recent point is a check point, and in decision block 265 the program determines whether the present or most recent point is at the end of a stroke. The letter profiles referred to in block 201 of FIG. 7 contain one or more criteria for the ending point of each stroke, any of which criteria, if met, results in an affirmative decision by decision block 265 indicating that the present point is at the end of the present stroke. A negative determination in decision block 265 results in the program returning to block 204 in FIG. 7, and if there is an affirmative decision so that block 206 is entered, the points stored in block 250, 252 ... 264 of FIG. 7B then are used to supply the points referred to in block 206. An affirmative decision in block 265 results in all points since the last check point being stored, as indicated in block 268, and the program then exits via block 269 to decision block 217 in FIG. 7.

Microfiche Appendix 2 submitted herewith constitutes an object code printout of the program of FIGS. 6, 7, 7A, 7B, and 8 annotated to indicate which portions correspond to the various figures.

Dramatically improved handwriting skill-building is possible with the present invention, which makes it possible for the teacher or parent to instantly detect particular "process problems" that a particular student is having, whereas in the past it has been impossible for a teacher or parent to precisely observe "deviations" in the various subtle pen tilt angle, pen tilt direction, height, pressure, grip, acceleration/deceleration, timing and pause per parameters associated with the activity of even one student, let alone a classroom of students.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

For example, a program could be provided to analyze the measured pen parameters to detect the level of stress of a student, and then use that information in determining appropriate corrective feedback to the student (or to the parent or teacher). The same general technique and system can be used to teach skill-building exercises for many activities other than handwriting which involve gradual hand-eye-mind development.

It should be appreciated that all of the pen data used in the described preferred embodiment is not necessarily essential to effective use of the basic method and apparatus of the invention to teach handwriting skills. An acceptable system might use only pen data for the x,y pen tip coordinates and a pen tip motion parameter such as velocity or acceleration to detect and generate corrective messages in response to student handwriting "process" errors.

Furthermore, the basic system and technique described may be used to aid in teaching other motor skills than handwriting, for example, operation of controls for machines.

Although the above described embodiment of the invention analyzes and compares characters or words by analyzing individual "strokes" or word characters thereof, respectively, future effort may lead to a somewhat different approach. For example, "strokes" could be defined as the portion of a character between when the pen tip comes in contact with the digitizing surface and when the pen tip is lifted. Or, a character or word as a whole could be compared on a pixel-by-pixel basis with a stored character or word "template", respectively. Although the movie objects are downloaded to tablet 10 via a parallel port in the described embodiment, the advantages of the described "frame differencing" technique and the data compression would be applicable to downloading the movie objects via a sufficiently fast serial port, SCSI or PCM/CIA port or Plug and Play port.

APPENDIX 1

E:CSERVE/DOWNLOAD/SCRIPT.TXT 2/14/95
```
open intoclas.rle
open chalk.rle
open class2bd.rle
show
lesson 1
hide
open back2cls.rle
exit
:retry
open tablet tablet1.rle
run A 280 88
if result ok goto ok1
showerror
:ok1
open tablet tablet2.rle
run A 475 88
if result ok goto ok2
showerror
:ok2
open tablet tablet3.rle
run A 181 274
if result ok goto ok3
showerror
goto keepGoing
:ok3
open tablet tablet4.rle
:keepGoing
hide
open back2cls.rle
exit
if result error goto retry
open printroc.rle
```

What is claimed is:

1. A method of teaching handwriting skills to a student, comprising the steps of:

(a) operating a computer to display a stroke of a character to be written on a digitizing surface of a digitizer;

(b) operating the computer to prompt the student to use a digitizing pen to write the stroke on the digitizing surface;

(c) as the student writes the character on the digitizing surface, operating the digitizer to measure pen data including x,y coordinate values, pen tip pressure, finger grip pressure on the pen, pen tilt direction, pen tilt angle, and pen tip height above the digitizing surface for various pixels of the digitizing surface, and determining a representative time of measurement of the pen data for each of the pixels, respectively;

(d) operating the computer to compare the pen data for each pixel with corresponding stored reference pen data for that pixel, respectively;

(e) operating the computer to determine if the comparisons of step (d) indicate that the student is having difficulty in performing a process of writing the stroke; and (f) operating the computer to determine if corrective action by the student in performing the process of writing the stroke is needed and, if it is, operating the computer to present appropriate corrective information for performing the process of writing the stroke to the student at a beneficial time.

2. The method of claim 1 including operating the computer in steps (a), (b), (d), (e), and (f) in accordance with stored curriculum information, wherein the curriculum information includes a plurality of handwriting lessons each including a plurality of video objects and a plurality of corresponding sound objects and scripting information, the video objects each representing a plurality of images which produce video images when displayed in rapid sequence, the sound objects each representing a plurality of sounds to be produced in synchronization with the video images, the scripting information representing coded information executable by the computer to display the images and produce the sounds in synchronization so as to communicate lesson information to the student.

3. The method of claim 2 including loading characters and sequence information included in the curriculum information for a selected handwriting lesson into a memory of the computer, each character including at least one stroke, wherein step (d) includes operating the computer to perform the steps of:

(1) selecting a next available character from the loaded characters to use as a present character to be written by the student;

(2) selecting a next available stroke of the present character as a present stroke to be written by the student;

(3) obtaining pen data in the comparison of step (c) for a present pixel to be analyzed, by either (i) obtaining such pen data from a previous pixel if that is necessary to determine if the present stroke is being written with a correct curvature, or otherwise (ii) obtaining such pen data from the next available pen data from the digitizer;

(4) storing the pen data obtained in step (3) for the present pixel;

(5) performing a check on the pen data for the present pixel to determine if a tip of the pen is up from the digitizing surface or down on the digitizing surface, and if the tip is up, determining if it has been up for a predetermined pause time, and if it has not, generating a pen tip up corrective message, and if the tip is down, determining if the present pixel is a first pen down point, and if it is, determining if the pen is within a first pen down point target area, and if it is not, generating a first pen down point corrective message;

(6) if the present stroke is to be curved, comparing a slope parameter thereof to a slope parameter reference value, and producing a first slope corrective message if the slope parameter is outside of a corresponding target range, and comparing an angular velocity parameter thereof to an angular velocity reference parameter, and producing an angular velocity corrective message if the angular velocity parameter is outside of a corresponding target range corresponding thereto;

(7) if the present stroke being drawn is to be straight, comparing a slope parameter thereof to a slope parameter reference value, and producing a second slope corrective message if the slope parameter is outside of a corresponding target range corresponding thereto;

(8) performing a plurality of comparisons of values of a pen tip speed parameter, a pressure parameter, a pen tilt direction parameter, a pen tip height parameter, and a finger force parameter to corresponding reference parameter values, respectively, and producing corresponding corrective messages if such values are not within corresponding target ranges, respectively;

(9) performing a plurality of tests on the pen data of the present pixel and, if any of the tests is met, storing pen data received from the digitizer for all pixels of the digitizing surface affected by the pen since a most recent check point;

(10) using the pen data stored in step (9) to determine if the present pixel is at the end of the present stroke, and if it is, determining if the present pixel is within a predetermined range from a stop point for the present stroke and if it is not, generating a corresponding stop point corrective message; and

(11) determining if the present pixel is at the end of the present character, and obtaining a next available stroke of the present character if the present pixel is not at the end of the present character, and obtaining a next available character if the present pixel is at the end of the present character.

4. The method of claim 3 wherein the plurality of tests of step (9) include determining if the present pixel is at a stop point of the present stroke, determining whether the present stroke is undergoing any of a right-left transition, a left-right transition, an up-down transition, a down-up transition, a counter-clockwise to clockwise transition, and a clockwise to counter-clockwise transition.

5. The method of claim 3 wherein step (7) includes comparing a crow slope parameter of the present stroke at the present pixel with a corresponding reference value thereof and also comparing an angular velocity variance parameter of the pen tip at the present pixel with a corresponding reference value thereof.

6. The method of claim 3 wherein step (8) includes comparing a speed moving average parameter at the present pixel with a corresponding reference value thereof, and comparing a speed variance parameter at the present pixel with a corresponding reference value thereof.

7. The method of claim 3 wherein step (8) includes comparing a pen tip pressure moving average parameter at the present pixel with a corresponding reference value thereof, and comparing a pen tip pressure variance parameter at the present pixel with a corresponding reference value thereof.

8. The method of claim 3 wherein step (8) includes comparing a pen tilt direction moving average parameter at the present pixel with a corresponding reference value thereof, and comparing a pen tilt direction variance parameter at the present pixel with a corresponding reference value thereof.

9. The method of claim 3 wherein step (8) includes comparing a pen tip height moving average parameter at the present pixel with a pen tip height variance parameter with a corresponding reference value thereof.

10. The method of claim 3 wherein step (8) includes comparing a finger force parameter at the present pixel with a corresponding reference value thereof.

11. The method of claim 3 wherein the digitizer is included in a student station.

12. The method of claim 1 including determining whether a deviation of the character written on the digitizing surface is a major, medium, or minor deviation and determining on that basis whether the corrective feedback information is to be presented to the student immediately, at the end of a present stroke, or at the end of a present line.

13. The method of claim 2 wherein the video objects each include image frames including full-screen image frames and partial-screen image frames, wherein the partial-screen image frames contain mainly changed image areas and exclude image areas which are unchanged relative to preceding image frames.

14. The method of claim 13 wherein the digitizer is included in a tablet unit separate from the computer and linked to the computer by a parallel port in the tablet unit and a parallel port in the computer, the tablet unit including a display unit overlapping the digitizing surface, the method including composing the video objects of as many partial-screen image frames as practical to represent movement of images of the video objects and making each partial-screen image frame as small as practical so as to exclude as many unchanged pixels as practical from information to be transmitted from the computer to the tablet unit, and transmitting all image frames in a compressed data format from the computer to the tablet unit via the parallel ports, whereby video objects containing animated subject matter with sufficient image movement to teach the handwriting skills can be downloaded from the computer to the tablet unit and displayed on the display unit thereof.

15. The method of claim 2 including developing the curriculum information by inputting image information and corresponding sound information into an object-generating program to produce the video objects and the sound objects and inputting English-like words into a text editor program to produce the scripting information.

16. The method of claim 2 wherein a host computer and the microcomputer each include a wireless communication interface, and wherein a communicating of the lesson information from the host computer to the student is accomplished by means of the wireless communication interface.

17. The method of claim 16 including performing steps (a) through (f) in conjunction with a plurality of student stations each including a respective computer operating as recited in steps (a) through (f) each communicating with teacher station including the host computer.

18. The method of claim 2 including operating the computer to assemble the measured pen data into analysis objects and wherein the comparing of step (d) includes comparing the analysis objects with video objects which represent the corresponding reference pen data.

19. A method of teaching handwriting skills to a student, comprising the steps of:
 (a) operating a computer to display a stroke of a character to be written on a digitizing surface of a digitizer;
 (b) operating the computer to prompt the student to use a digitizing pen to write the stroke on the digitizing surface;
 (c) as the student writes the character on the digitizing surface, operating the digitizer to measure pen data representing a plurality of pen position parameters and pen movement parameters for various pixels of the digitizing surface, and determining a representative time of measurement of the pen data for each of the pixels, respectively;
 (d) operating the computer to compare the pen data for each pixel with corresponding stored reference pen data for that pixel, respectively;
 (e) operating the computer to determine if the comparisons of step (d) indicate that the student is having difficulty in performing a process of writing the stroke; and
 (f) operating the computer to determine if corrective action by the student in performing the process of writing the stroke is needed and, if it is, operating the computer to present appropriate corrective information for performing the process of writing the stroke to the student at a beneficial time.

20. A method of teaching motor skills to a student, comprising the steps of:
 (a) operating a computer to display information representing a movement of a control element to be made by the student to prompt the student to move the control element, the control element being coupled to a digitizer;
 (b) as the student moves the control element, operating the digitizer to measure data representing a plurality of parameters representative of a process of making the movement of the control element, and capturing a representative time of measurement of the data for each pixel of an area of a display of the computer, respectively;
 (c) operating the computer to compare the measured data and captured data for each pixel with stored corresponding reference data, respectively;
 (d) operating the computer to determine if the comparisons of step (c) indicate that the student is having difficulty in performing the process of making the movement; and
 (e) operating the computer to determine if corrective action by the student in performing the process of making the movement is needed and, if it is, operating the computer to present appropriate corrective information for performing the process of making the movement to the student at a beneficial time.

21. A system for teaching handwriting skills to a student, comprising in combination:
 (a) a host computer;
 (b) a digitizer having a digitizing surface, a digitizing pen adapted to write a stroke of a character on the digitizing surface, the digitizer being adapted to digitize location parameters and orientation parameters of a tip of the digitizing pen located on or near the digitizing surface, the digitizer is adapted to measure pen data including x,y pen tip coordinate values, pen tip pressure, finger grip pressure on a barrel of the pen, pen tilt angle, pen tilt direction, and pen tip height above the digitizing surface for each of the pixels;
 (c) timing circuitry associated with the digitizer and adapted to capture a representative time of measurement of the location parameters and orientation parameters for each pixel of the digitizing surface affected by the digitizing pen, respectively; and
 (d) programmed circuitry in the host computer adapted to
  i. compare the location parameters and orientation parameters for each pixel with corresponding reference parameters, respectively,
  ii. determine if the student is having difficulty in performing a process of writing the stroke on the basis of comparison of the location parameters and orientation parameters with the reference parameters, and
  iii. determine if corrective action in performing the process of writing the stroke by the student is needed and, if such corrective action in performing the process of writing the stroke is needed, present appropriate corrective information to the student at a beneficial time.

22. The system of claim 21 wherein the host computer includes a curriculum file containing curriculum information including a plurality of handwriting lessons each including scripting information and a plurality of video objects and a plurality of corresponding sound objects, the video objects each representing a plurality of images which produce video images when displayed in rapid sequence, the sound objects each representing a plurality of sounds to be produced in synchronization with the video images, the scripting information representing coded information executable by the computer to display the plurality of images and produce the plurality of sounds in synchronization so as to communicate lesson information to the student.

23. The system of claim 22 wherein the host computer stores characters and information selected from the curriculum information for a particular handwriting lesson, each character including at least one stroke, the host computer being programmed to (1) select a next available character from the characters to be used as a present character;

(2) select a next available stroke of the present character as a present stroke;

(3) obtain pen data for a present pixel to be analyzed, by either (i) obtaining such pen data from a previous pixel if that is necessary to determine if the present stroke is being written with a correct curvature, or otherwise (ii) obtaining such pen data from next available pen data from the digitizer;

(4) check the pen data for the present pixel to determine if the tip of the digitizing pen is up from the digitizing surface or down on the digitizing surface, and if the tip of the digitizing pen is up, determine if it has been up for a predetermined pause time, and if the time has not been up for the predetermined pause time, generate a pen tip up corrective message, and if the tip of the digitizing pen is down, determine if the present pixel is a first pen down point, and if it is, determine if the tip of the digitizing pen is within a first pen down target area, and if the tip of the digitizing pen is not within the first pen down target area, generate a first pen down corrective message;

(5) if the present stroke is to be curved, compare a slope parameter thereof to a slope parameter reference value, and produce a first slope corrective message if the slope parameter is outside of a corresponding target range, and compare an angular velocity parameter thereof to a corresponding angular velocity reference parameter, and produce an angular velocity corrective message if the angular velocity parameter is outside of a corresponding target range;

(6) if the present stroke being drawn is to be straight, compare a slope parameter thereof to a corresponding slope parameter reference value, and produce a second slope corrective message if the slope parameter is outside of a corresponding target range;

(7) perform a plurality of comparisons of values of a pen tip speed parameter, a pressure parameter, a pen tilt angle parameter, a pen tilt direction parameter, a pen tip height parameter, and a finger force parameter to corresponding reference parameter values, respectively, and produce corresponding corrective messages if such values are not within corresponding target ranges, respectively;

(8) perform a plurality of tests on the pen data of the present pixel and, if any of the tests is met, store pen data received from the digitizer for all pixels affected by the digitizing pen since a most recent check point;

(9) use the stored pen data to determine if the present pixel is at the end of the present stroke, and if it is, determine if the present pixel is within a predetermined range of a stop point for the present stroke and if it is not, generate a corresponding stop point corrective message; and

(10) determine if the present pixel is at the end of the present character, and obtain the next available stroke of the present character if the present pixel is not at the end of the present character, and obtain the next available character if the present pixel is at the end of the present character.

24. A system for teaching handwriting skills to a student, comprising in combination:

(a) a digitizer having a digitizing surface, a digitizing pen adapted to write a stroke of a character on the digitizing surface, the digitizer being adapted to digitize location parameters and orientation parameters of the digitizing pen at each pixel of the digitizing surface affected by the location and orientation of the digitizing pen;

(b) timing circuitry associated with the digitizer and adapted to capture a representative time of measurement of the location and orientation parameters for each of the pixels, respectively; and (c) a host computer programmed to
  i. compare the location parameters and orientation parameters for each pixel with corresponding reference parameters, respectively,
  ii. determine if the student is having difficulty in performing a process of writing the stroke on the basis of comparison of the location parameters and orientation parameters with the corresponding reference parameters, and
  iii. determine if corrective action by the student in performing the process of writing the stroke is needed and, if such corrective action is needed, present appropriate corrective information for performing the process of writing the stroke to the student at a beneficial time.

25. A system for teaching motor skills to a student, comprising in combination:

(a) a digitizer, (b) a control element to be moved by the student, the digitizer being adapted to digitize a plurality of position parameters of the control element;

(c) timing circuitry associated with the digitizer and adapted to capture a representative time of measurement of each position parameter for each pixel of an area of a display, the plurality of position parameters indicating how the student performs a process by which the student performs a movement of the control element; and (c) a host computer programmed to
  i. compare each position parameter for each pixel with a corresponding reference parameter, respectively,
  ii. determine if the student is having difficulty in performing the process of making the movement of the control element, on the basis of comparison of the position parameters with the corresponding reference parameters, and
  iii. determine if corrective action by the student in performing the process of making the movement is needed and, if such corrective action is needed, present appropriate corrective information for the process of making the movement to the student at a beneficial time.

* * * * *